US012804594B2

(12) United States Patent
Wang

(10) Patent No.: US 12,804,594 B2
(45) Date of Patent: Nov. 17, 2026

(54) ISTB CALIBRATION TO IMPROVE POSITIONING ENGINE SOLUTION SEPARATION AVAILABILITY

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/443,051

(22) Filed: Feb. 15, 2024

(65) Prior Publication Data

US 2025/0267623 A1 Aug. 21, 2025

(51) Int. Cl.
*H04W 64/00* (2009.01)
*G01S 5/02* (2010.01)

(52) U.S. Cl.
CPC ........... *H04W 64/006* (2013.01); *G01S 5/021* (2013.01); *G01S 5/0244* (2020.05)

(58) Field of Classification Search
CPC ....... H04W 64/00; H04W 64/006; G01S 5/02; G01S 5/0244; G01S 5/021; G01S 19/07; G01S 19/41; G01S 19/44; G01S 19/25; G01S 19/23; G01S 19/39
See application file for complete search history.

(56) References Cited

U.S. PATENT DOCUMENTS

| | | | | |
|---|---|---|---|---|
| 11,802,971 | B2 | 10/2023 | Luo et al. | |
| 2012/0242542 | A1 | 9/2012 | Yudanov et al. | |
| 2016/0195617 | A1 | 7/2016 | Phatak et al. | |
| 2022/0035044 | A1 | 2/2022 | Cookman et al. | |
| 2022/0099841 | A1* | 3/2022 | Farmer | G01S 19/22 |
| 2022/0171076 | A1 | 6/2022 | Wang et al. | |
| 2022/0283314 | A1* | 9/2022 | Luo | G01S 19/07 |
| 2022/0283316 | A1* | 9/2022 | Zampetti | G01S 19/14 |
| 2023/0030332 | A1 | 2/2023 | Carcanague et al. | |

FOREIGN PATENT DOCUMENTS

WO 2022187759 A2 9/2022

* cited by examiner

*Primary Examiner* — Michael A Faragalla
(74) *Attorney, Agent, or Firm* — Procopio Cory Hargreaves & Savitch LLP

(57) ABSTRACT

Aspects presented herein may enable a UE to calibrate inter/intra system/signal time biases (ISTB) for a positioning engine (PE) and refine/re-calibrate the calibrated ISTB continuously to achieve an improved positioning accuracy and performance. In one aspect, a UE calibrates a set of ISTBs for a set of satellites to meet a first accuracy threshold, where at least two satellites in the set of satellites operate on different frequency bands or are associated with different satellite types. The UE performs, based on the set of calibrated ISTBs, an outlier detection using solution separation (SS) receiver autonomous integrity monitoring (RAIM). The UE obtains an output of a PE module based on outlier information from the outlier detection.

20 Claims, 13 Drawing Sheets

1000A

1000B

ISTB CALIBRATION TO IMPROVE POSITIONING ENGINE SOLUTION SEPARATION AVAILABILITY

TECHNICAL FIELD

The present disclosure relates generally to communication systems, and more particularly, to wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some telecommunication standards also provide positioning protocols and techniques that enable mobile network operators to provide high-accuracy location services to their subscribers. There also exists a need for further improvements in these positioning protocols and techniques.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, an apparatus is provided for wireless communication at a user equipment (UE). The apparatus includes at least one memory and at least one processor coupled the at least one memory. The at least one processor, individually or in any combination, is configured to calibrate a set of inter/intra system/signal time biases (ISTBs) for a set of satellites to meet a first accuracy threshold, where at least two satellites in the set of satellites operate on different frequency bands or are associated with different satellite types. The at least one processor, individually or in any combination, is further configured to perform, based on the set of calibrated ISTBs, an outlier detection using solution separation (SS) receiver autonomous integrity monitoring (RAIM). The at least one processor, individually or in any combination, is further configured to obtain an output of a positioning engine (PE) module based on outlier information from the outlier detection.

In another aspect of the present disclosure, a method of wireless communication at a UE is provided. The method includes calibrating a set of ISTBs for a set of satellites to meet a first accuracy threshold, where at least two satellites in the set of satellites operate on different frequency bands or are associated with different satellite types. The method further includes performing, based on the set of calibrated ISTBs, an outlier detection using SS RAIM. The method further includes obtaining an output of a PE module based on outlier information from the outlier detection.

In another aspect of the present disclosure, a computer-readable medium storing computer executable code is provided. The code when executed by at least one processor causes the at least one processor to calibrate a set of ISTBs for a set of satellites to meet a first accuracy threshold, where at least two satellites in the set of satellites operate on different frequency bands or are associated with different satellite types. The code when executed by the at least one processor further causes the at least one processor to perform, based on the set of calibrated ISTBs, an outlier detection using SS RAIM. The code when executed by the at least one processor further causes the at least one processor to obtain an output of a PE module based on outlier information from the outlier detection.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
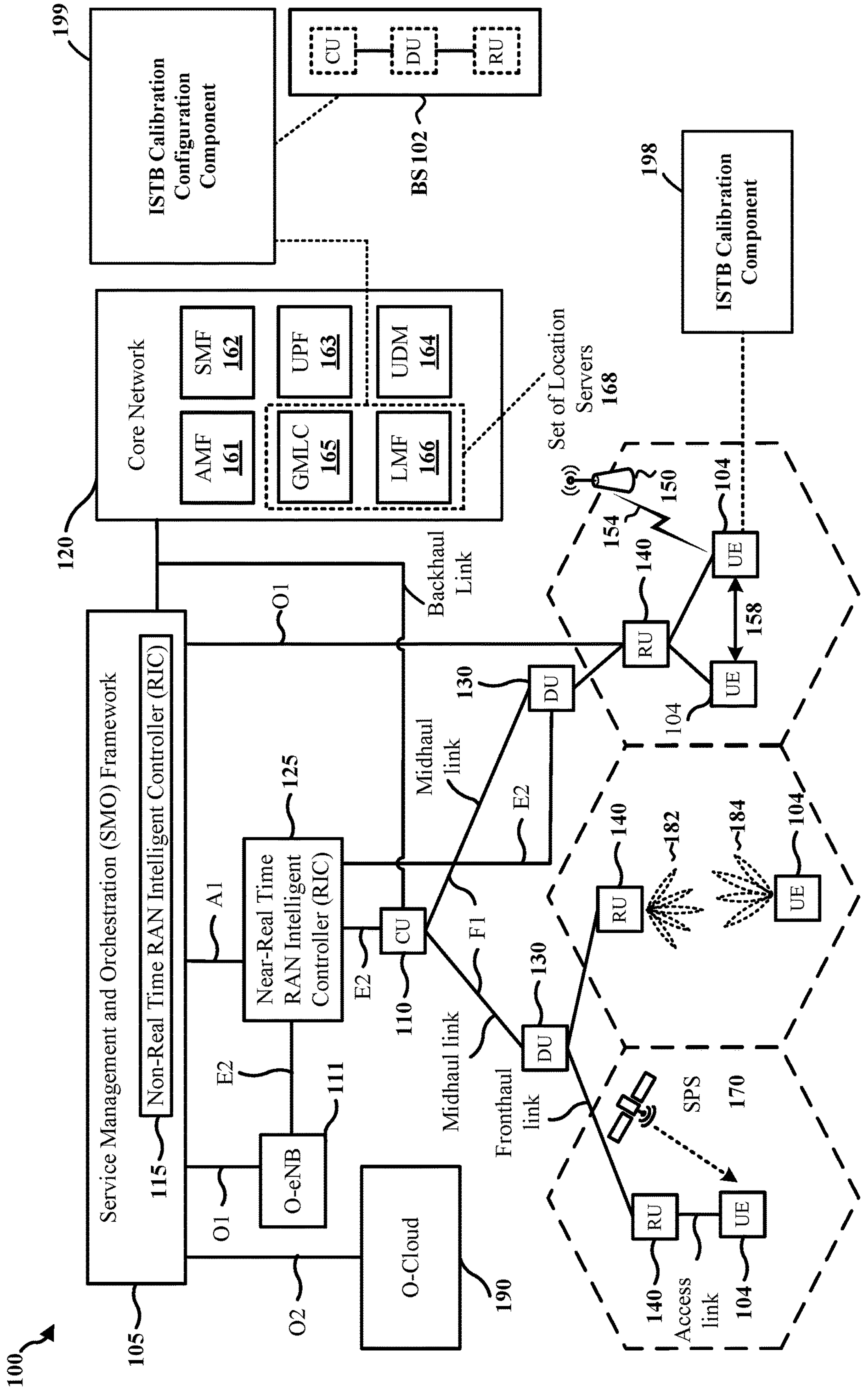
FIG. 1 is a diagram illustrating an example of a wireless communications system and an access network.

Aspects presented herein may improve the applicability and availability of solution separation (e.g., the solution separation (SS) receiver autonomous integrity monitoring (RAIM)) for positioning engines (e.g., precise positioning engine (PPE), precise point positioning (PPP), etc.). Aspects presented herein may enable inter/intra system/signal time biases (ISTB) to be calibrated or pre-calibrated for a positioning engine (which may be referred to as the "Level-1 calibration" for purposes of the present disclosure), and the positioning engine may be configured to refine/calibrate this calibrated/pre-calibrated ISTB to achieve an improved positioning accuracy and performance (which may be referred to as the "Level-2 calibration" for purposes of the present disclosure), such as by using the outlier information obtained based on the calibrated/pre-calibrated ISTB. For example, in one aspect of the present disclosure, a UE (or a positioning engine of the UE) may be configured to perform ISTB pre-calibration to a first threshold of accuracy (e.g., <10 cm). Then, the UE may be configured to apply the calibrated ISTB in a challenging environment, which increases the availability/applicability of using SS RAIM where rough position viSS RAIM may provide better outlier detection/removal.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an ISTB calibration component 198 that may be configured to calibrate a set of ISTBs for a set of satellites to meet a first accuracy threshold, where at least two satellites in the set of satellites operate on different frequency bands or are associated with different satellite types; perform, based on the set of calibrated ISTBs, an outlier detection using SS RAIM; and obtain an output of a PE module based on outlier information from the outlier detection. In certain aspects, the base station 102 or the one or more location servers 168 may have an ISTB calibration configuration component 199 that may be configured to provide configurations and/or parameters related to ISTB calibration for the UE 104.

Figures 2A, 2B, 2C, 2D:
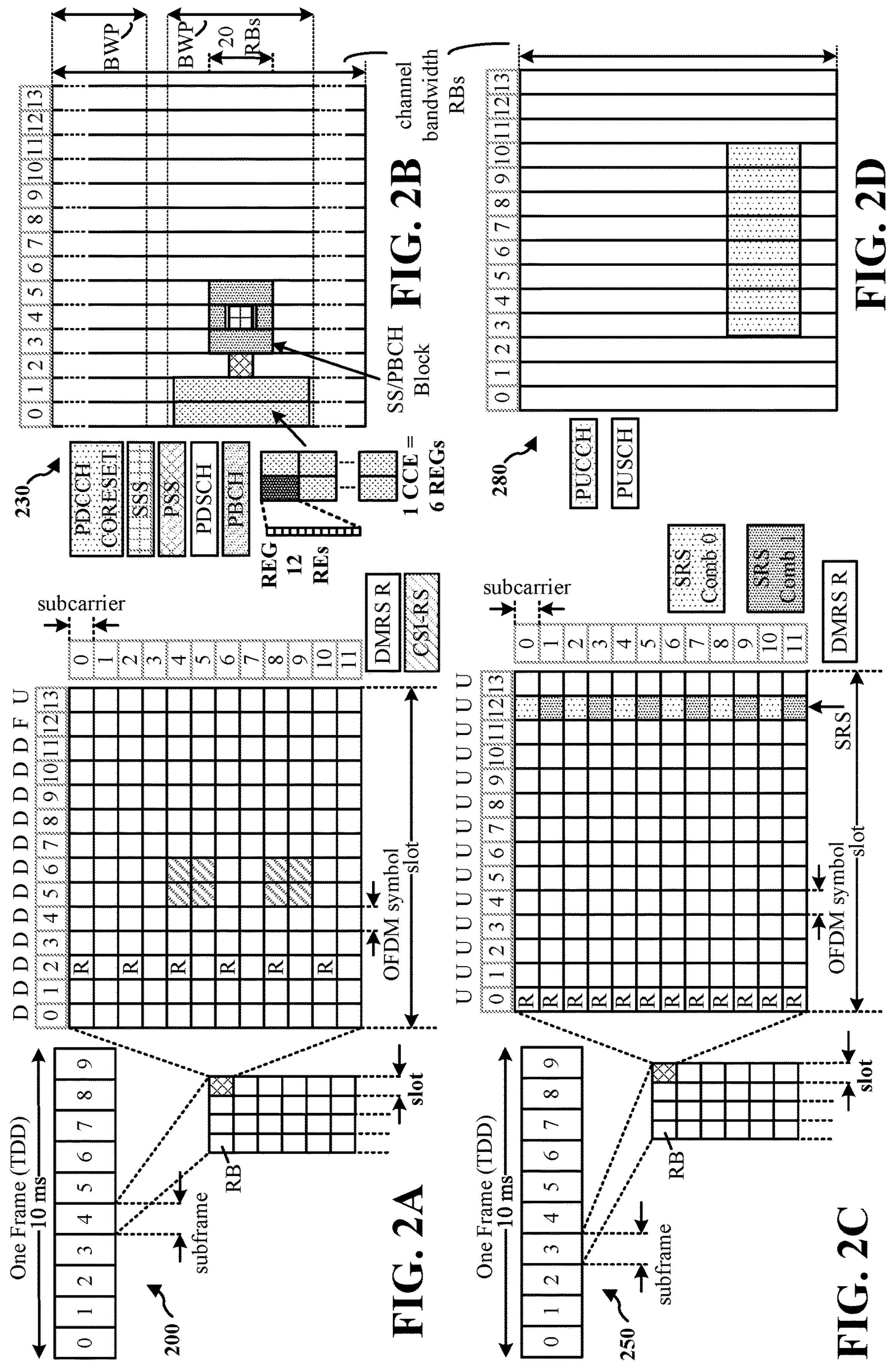
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
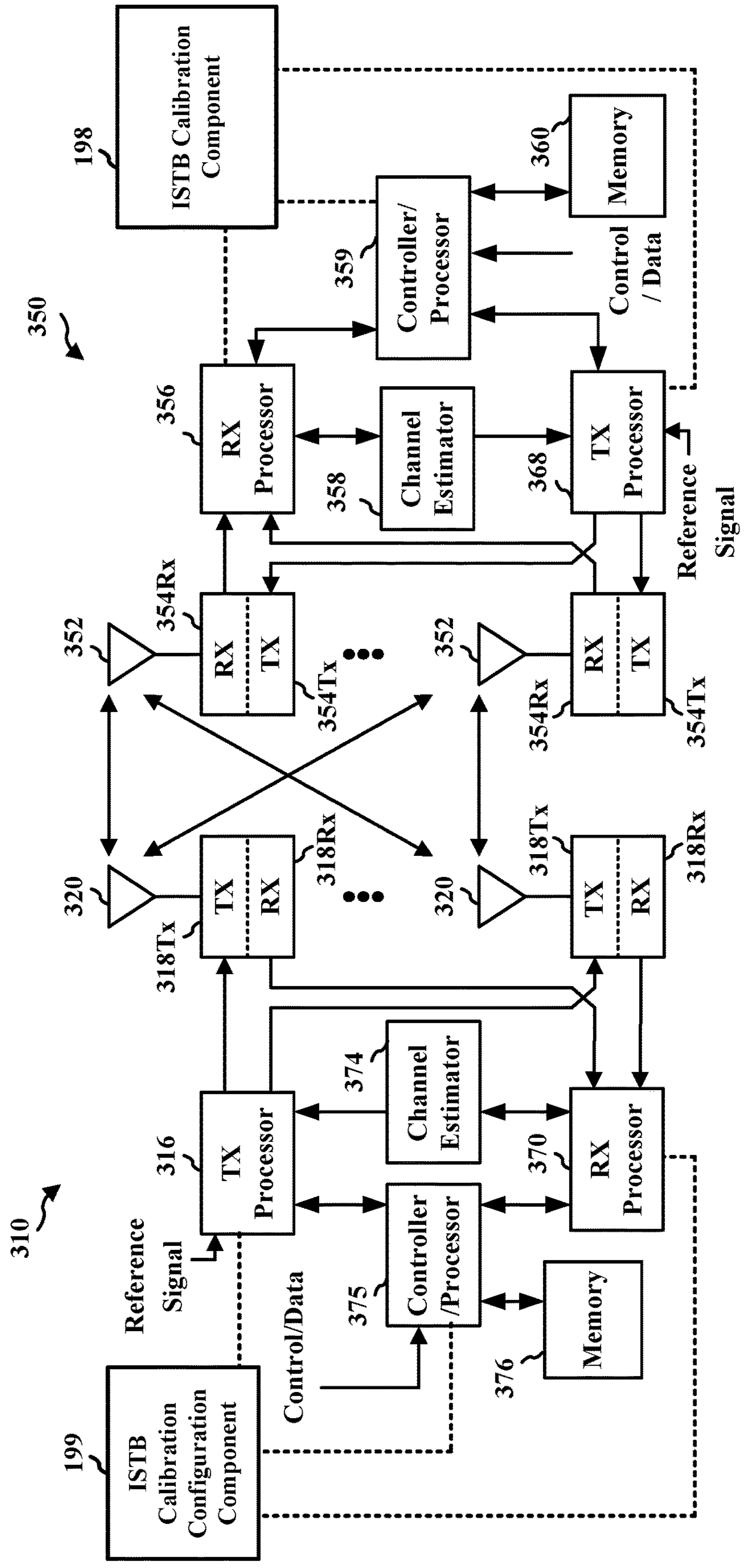
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the ISTB calibration component 198 of FIG. 1.

At least one of the TX processor 316, the RX processor 370, and the controller/processor 375 may be configured to perform aspects in connection with the ISTB calibration configuration component 199 of FIG. 1.

Figure 4:
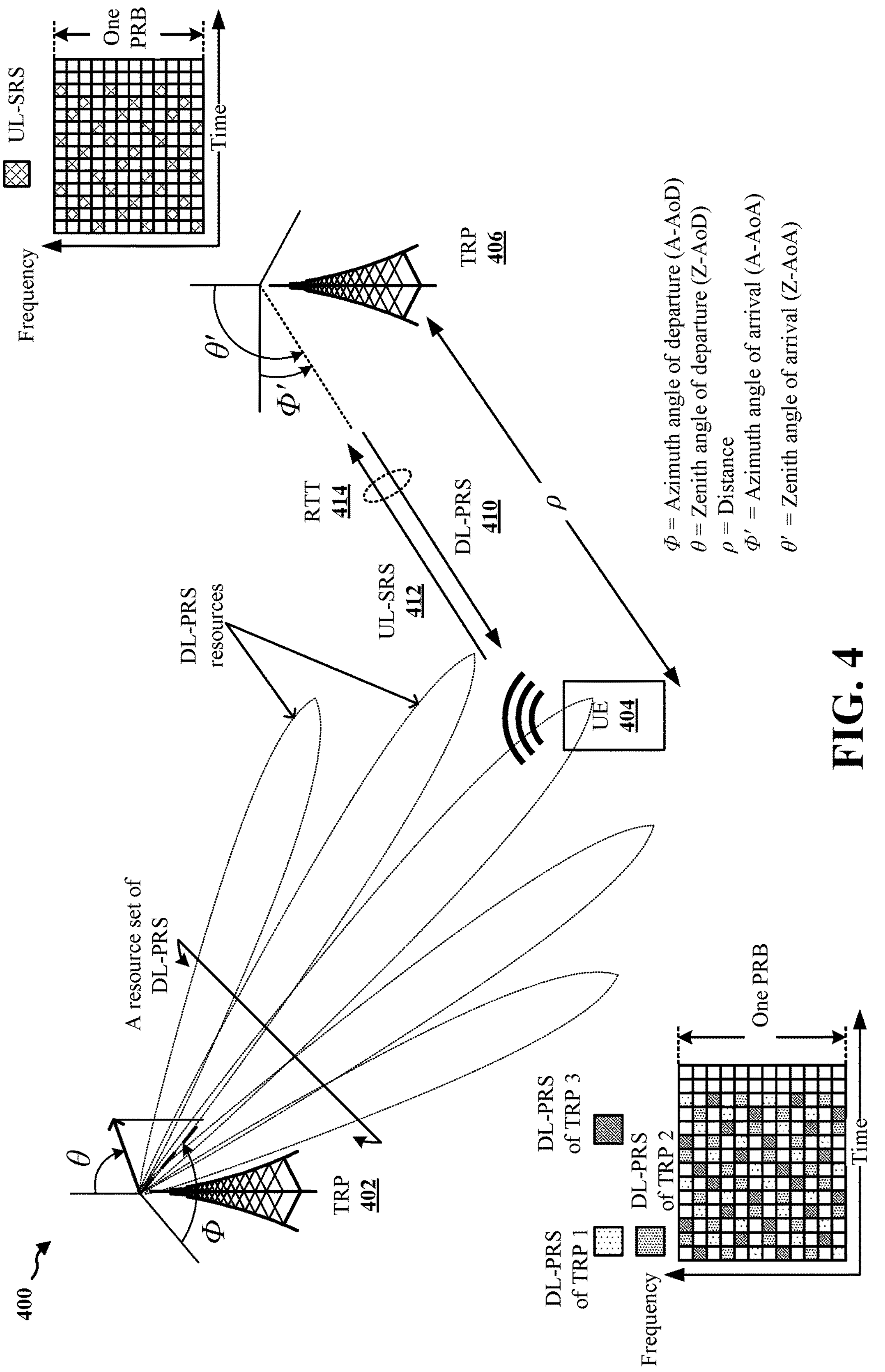
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

A device (e.g., a UE) equipped with a global navigation satellite system (GNSS) receiver may determine its location based on reception of signals from multiple satellites, which may be referred to as "GNSS-based positioning" or "satellite-based positioning." GNSS is a network of satellites broadcasting timing and orbital information used for navigation and positioning measurements. In addition, GNSS may refer to the International Multi-Constellation Satellite System, which may include global positioning system (GPS), global navigation satellite system (GLONASS), Beidou, Galileo, and any other constellation system. GNSS may include multiple groups of satellites (which may be referred to as GNSS satellites), known as constellations, that broadcast signals (which may be referred to as GNSS signals) to control stations and users of the GNSS. Based on the broadcast signals, the users may be able to determine their locations (e.g., via a trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
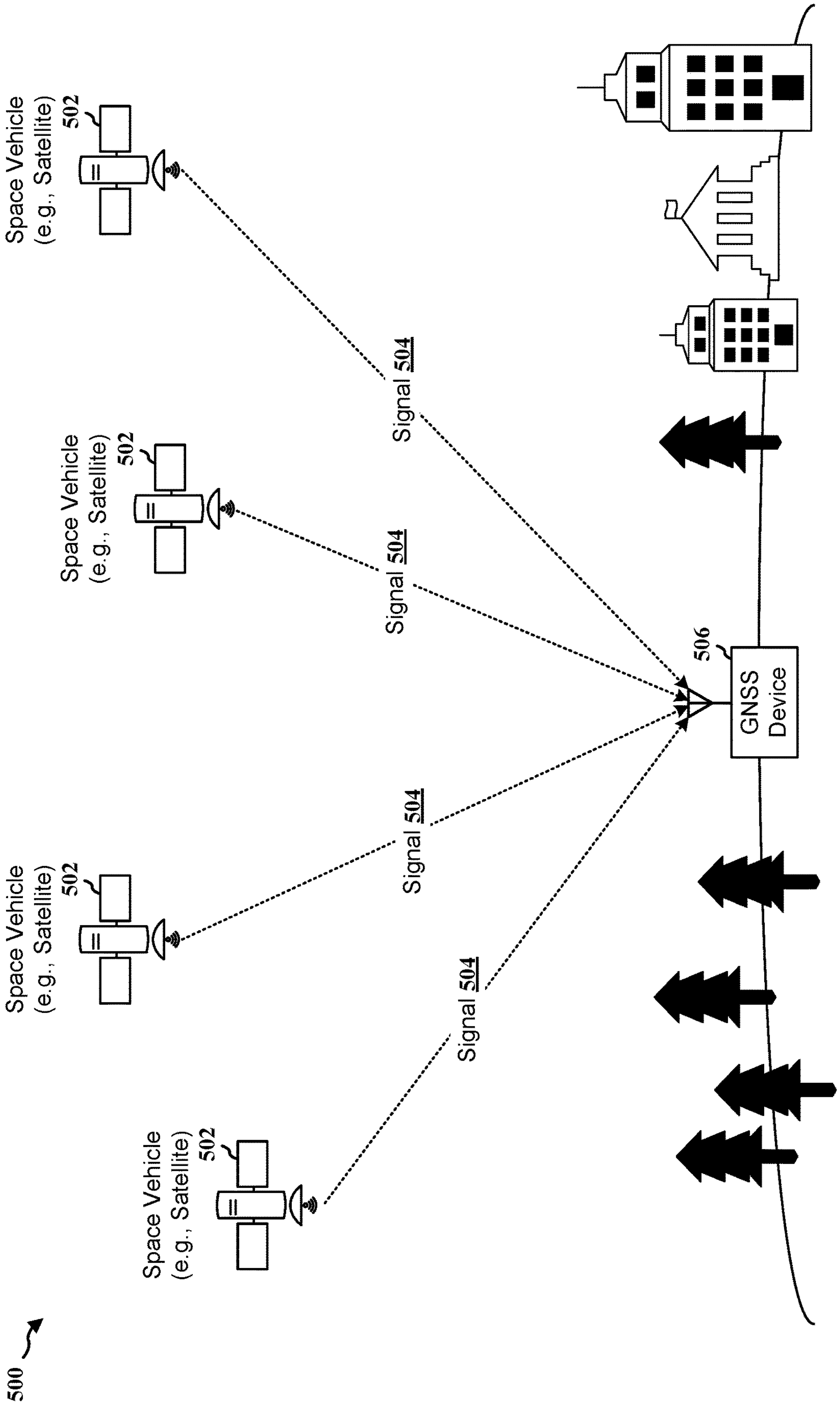
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned.

The accuracy of GNSS-based positioning may depend on various factors, such as satellite geometry, signal blockage, atmospheric conditions, and/or receiver design features/quality, etc. For example, GNSS receivers used by smartphones or smart watches may have lower accuracy compared to GNSS receivers used by vehicles and surveying equipments. To improve the accuracy of GNSS positioning (e.g., from meters to centimeters), a real time kinematics (RTK) technique or mechanism (which may collectively be referred to as an "RTK engine" hereafter) may be used for a positioning device (e.g., a UE, a surveying equipment, an automobile GNSS system, etc.). For example, an RTK engine may enable a positioning device to use correction information from a base station to mitigate one or more error sources in GNSS receiver pseudo-range (PR) and carrier-phase (CP) measurements, which may include satellite orbit error, satellite clock error, and/or atmospheric error, etc. Thus, better accuracy may be achieved by the positioning device.

Figure 6:
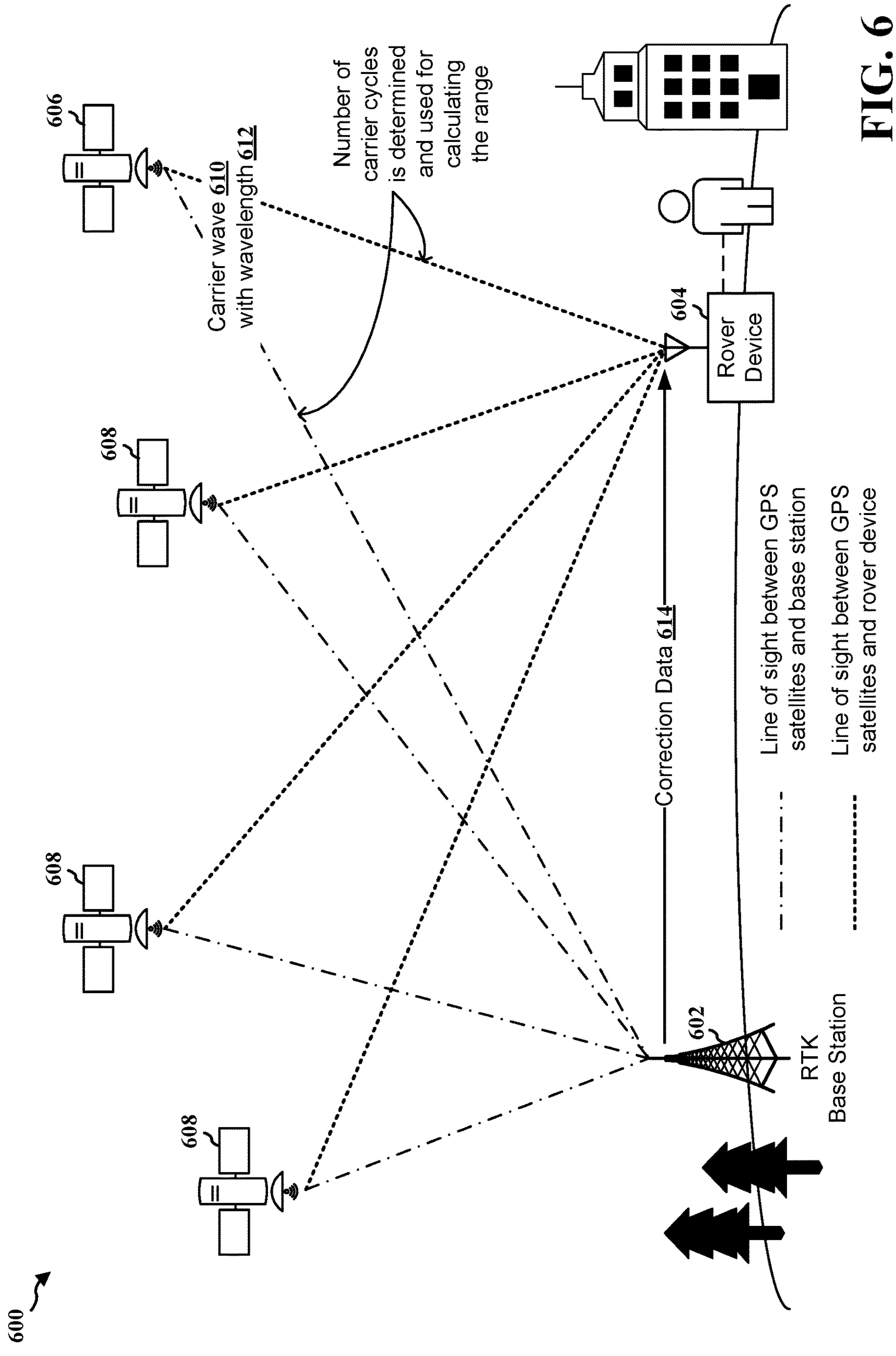
FIG. 6 is a diagram illustrating an example of a real time kinematics (RTK) positioning in accordance with various aspects of the present disclosure.

FIG. 6 is a diagram 600 illustrating an example of an RTK positioning in accordance with various aspects of the present disclosure. In one example, at least two receivers may be used in association with the RTK positioning, where at least one of the receivers may be stationary, which may be referred to as a base station 602 or an RTK base station, and at least one other receiver may be mobile (e.g., may be moving from time to time), which may be referred to as a rover or a rover device 604 (e.g., a GNSS/GPS receiver, a UE, a rover station, etc.). In other words, an RTK system may include at least a base station and a rover device, where the base station may be a stationary receiver whose location is known.

A range between an SV 606 (e.g., a GNSS/GPS satellite) and the rover device 604 or between the SV 606 and the base station 602 may be calculated by determining a number of carrier cycles between the SV 606 and the rover device 604 or the base station 602, and multiplying this number by the carrier wavelength 612 of a carrier wave 610 (e.g., a carrier signal) transmitted by the SV 606. For example, if the SV 606 is transmitting a carrier wave 610 with a carrier wavelength 612 of ten (10) meters, and the rover device 604 receives the carrier wave 610 and determines that there are five hundred (500) carrier cycles between the SV 606 and the rover device 604, then the rover device 604 may calculate the distance between the SV 606 and the rover device 604 by multiplying the number of carriers cycles determined (e.g., 500) with the carrier wavelength 612 (e.g., 10 meters), which may be five thousand meters (e.g., $500\times10=5000$). Similarly, the base station 602 may also receive the carrier wave 610 from the SV 606 and determine its ranges from the SV 606 based on the carrier wavelength 612 of the carrier wave 610 and the number of carrier cycles between the base station 602 and the SV 606. The rover device 604 and/or the base station 602 may calculate ranges (e.g., distances) between the rover device 604/base station 602 and multiple (e.g., four or more) SVs (e.g., SVs 606 and 608) to determine their geographical locations (e.g., their locations on the Earth).

During the RTK positioning, the rover device 604 (e.g., a UE, a client device, etc.) may undergo an "ambiguity resolution" process to determine the number of carrier cycles between the SV 606 and the rover device 604. In other words, when the rover device 604 receives a carrier wave from an SV 606, it may take time for the rover device 604 to figure out how many carrier cycles are between the SV 606 and the rover device 604. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity." In some examples, the process of a GNSS receiver resolving the ambiguity may be referring to as converging, and the time it takes a device to resolve the ambiguity may be referred to as a convergence time.

In some scenarios, ranges calculated by the rover device 604 may include errors due to SV clock and ephemerides, and ionospheric and tropospheric delays, etc. Also, as the rover device 604 is more likely to be moving, the quality of a signal/carrier wave received from each SV may change as the rover device moves from one location to another location. For example, if the rover device 604 moves from an open sky area to an area with buildings, signals from one or more SVs 606/608 may be blocked/reflected by the buildings. As such, ranges calculated by the rover device 604 may start to drift and may include error(s).

On the other hand, as the base station 602 is likely to be stationary with a known location, and the base station 602 may be equipped with a more sophisticated and high-end GNSS receiver, the base station 602 may be able to maintain an accurate calculation for the ranges compared to the rover device 604. For example, the base station 602 may be located at a site (e.g., an open sky area) that has minimal environmental effects such as interference and multipath. As such, under the RTK positioning, as the base station 602 may have known its location already (e.g., via pre-surveying), the base station 602 may perform a measurement for an SV to obtain a base receiver measurement (e.g., to estimate a difference between the base station and the SV). Then, the base station 602 may minus the geometry distance between the base station location to SV location from the base receiver measurement to obtain a base correction (e.g., based on a difference or an error). The base station 602 may generate a correction data 614 (or a correction signal) based on the obtained base correction and transmit the correction data 614 to the rover device 604 to assist the rover device 604 in correcting the errors. For example, as the rover device 604 may locate in proximity to the base station 602 (e.g., within 6 miles, 12 miles, etc.), the rover device 604 is likely to encounter similar errors as the base station 602 (e.g., similar ionospheric and tropospheric delays, etc.). Thus, the rover device 604 may use the correction data 614 from the base station 602 to improve and expedite its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 604 may determine its position using algorithms that incorporate ambiguity resolution and differential correction. The position accuracy achievable by the rover device 604 may depend on its distance from the base station 602 and the accuracy of the differential corrections (e.g., the correction data 614).

In some examples, a software or an application that accepts positioning related measurements from global navigation satellite system (GNSS)/global positioning system (GPS) chipsets and/or sensors to estimate position, velocity, and/or altitude of a device may be referred to as a positioning engine (PE). In addition, a positioning engine that is capable of achieving certain high level of accuracy (e.g., centimeter/decimeter level accuracy) and/or latency may be referred to as a precise positioning engine (PPE). For example, a positioning engine that is capable of performing real-time kinematic (RTK) (e.g., receiving or processing correction data associated with RTK) may be considered as a PPE. Another example of PPE is a positioning engine that is capable of performing precise point positioning (PPP). PPP is a positioning technique that removes or models GNSS system errors to provide a high level of position accuracy from a single receiver. For purposes of the present disclosure, a "solution," such as a PE solution, a PPE solution, and/or a PPP solution, may refer to a set of outputs from a positioning engine module. For example, a PE solution may include a set of parameters associated with a Kalman Filter (KF) or a KF state, where the set of parameters may include position, velocity, timing, uncertainty, outlier information, integrity information, receiver clock, receiver clock rate, inter-satellite-type bias, and/or ambiguity terms, etc. In some examples, a solution may depend on GNSS satellite clock and orbit corrections, generated from a network of global reference station. Once the corrections are calculated, they may be delivered to the end user via satellite or over the Internet. These corrections may then be used by the receiver, which may result in decimeter-level or better positioning with no base station involved.

GNSS-based positioning may be subjected to various errors that may affect the accuracy of the positioning, and these errors may come from different sources and may impact the precision of the positioning data. For example, errors associated with GNSS-based positioning may include: (1) an ionospheric delay (e.g., delays caused by the ionosphere as a signal passes through), (2) a tropospheric delay (e.g., delays caused by the troposphere as a signal passes through due to humidity and atmospheric pressure variations, (3) clock errors (e.g., satellite clocks may not be perfect and their accuracy may introduce errors), (4) ephemeris errors (e.g., the ephemeris data, which provides information about the satellite's position over time, may not always be accurate), (5) multipath interference (e.g., signals may reflect off nearby surfaces, such as buildings or water, before reaching the receiver), (6) receiver noise (e.g., GNSS receivers may introduce noise or errors in the measurement process), and/or (7) satellite geometry (e.g., the arrangement of satellites in the sky relative to the receiver may affect the accuracy of the positioning), etc.

Receiver autonomous integrity monitoring (RAIM) is a technique that may be used in GNSS-based positioning for assessing the integrity of the signals received from satellites and ensuring the accuracy and reliability of the navigation solution. For example, GNSS systems, such as the GPS, may provide positioning, navigation, and timing information by triangulating signals from multiple satellites, and RAIM may be employed to detect and mitigate errors (e.g., which may include satellite errors discussed above) in these signals. In other words, the primary purpose of RAIM may be to identify and exclude faulty satellite signals from the navigation solution, which may also be referred to as GNSS outlier detection.

There may be different types of RAIM algorithms for GNSS outlier detection. For example, one type of RAIM is residual-based (RB) RAIM (RB RAIM), which uses all available measurements to identify the possible GNSS outlier based on residual analysis (e.g., based on a global check and a local check). In a traditional RAIM, the integrity of a navigation solution is assessed by comparing the measured pseudo-range or pseudo-range rate (distance measurements) from multiple satellites with the expected values based on the known positions of those satellites. Residuals are the differences between the measured and expected values. If the residuals exceed a predefined threshold, it may indicate a potential issue with the signal integrity, and the faulty satellite measurements may be excluded from the navigation solution. An RB RAIM takes the concept of residuals a step further by considering not just the individual satellite measurements but also the relationships between them. For example, instead of just looking at the residuals independently for each satellite, an RB RAIM may consider the inter-satellite measurements, and exploit the redundant information available from multiple satellites. By analyzing the relationships between satellites, the RB RAIM may detect and mitigate certain types of faults that may not be apparent in traditional RAIM. However, under the RB RAIM, there may be an assumption that the residuals are Gaussian (e.g., are based on a Gaussian distribution). Thus, when a significant amount of measurements has outliers (e.g., due to multipath), the RB RAIM may not work accurately (e.g., when 15 out of 30 measurements have outliers).

Another type of RAIM is the solution separation (SS) RAIM (SS RAIM), which use subsets of available measurements, and the strategy of how to use the subsets of available measurements may vary (e.g., just L5 subset, just above CN0 threshold subset, etc.). An SS RAIM may enable residual analysis to be conducted within each subset, and each subset may provide a position estimate. Under the SS RAIM, each subset may specify redundancy (e.g., the number of measurements is greater than the number of unknown estimates). Then, the SS RAIM may identify possible GNSS outliers based on comparison of position estimates of all subsets. For example, the SS RAIM may compare multiple independent position solutions generated by a GNSS receiver. These position solutions may be calculated using different combinations of available satellites and their measurements. By comparing these solutions, the GNSS receiver may detect any inconsistencies or errors in the measurements. If there is a problem with the measurements or if some of the satellite signals are unreliable, the position solutions may diverge significantly, and this divergence may be an indication that the integrity of the navigation solution might be compromised.

In some scenarios, the SS RAIM may specify higher computational cost, but may have better performance compared to the RB RAIM when a certain/significant amount of GNSS measurements have outliers. The SS RAIM may be used for improve GNSS-based positioning accuracy in a challenging environment (e.g., multiple outliers due to multipath). The SS RAIM may also provide integrity protection for automotive platform, and provide lower integrity risk bound.

Figure 7:
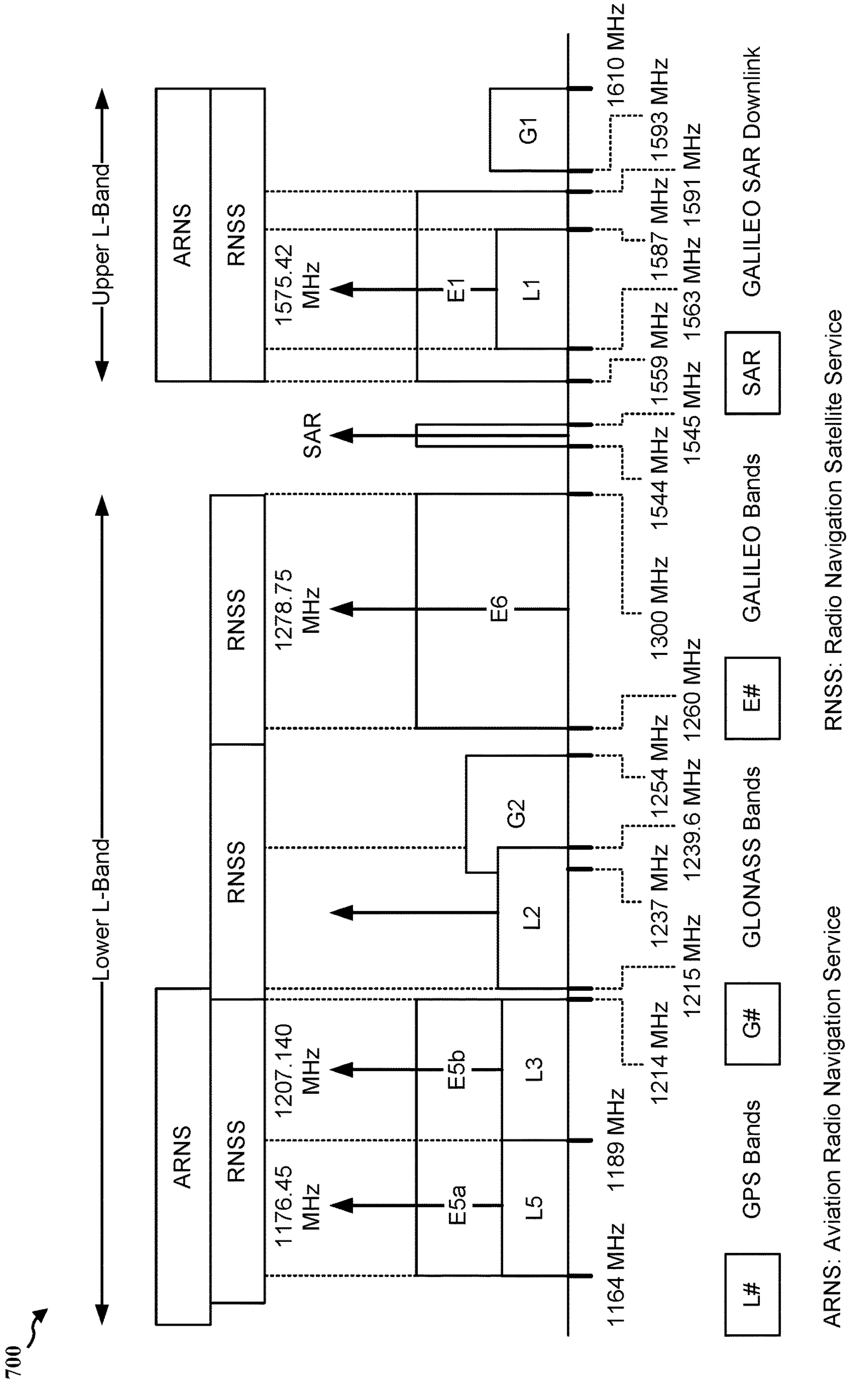
FIG. 7 is a diagram illustrating an example navigational frequency band for GNSS in accordance with various aspects of the present disclosure.

FIG. 7 is a diagram 700 illustrating an example navigational frequency band for GNSS (e.g., GPS, GLONASS, and Galileo, which may also be referred to as Radio Navigation Satellite System (RNSS)) in accordance with various aspects of the present disclosure. There may be two bands in the region allocated to the Aeronautical Radio Navigation Service (ARNS) on a primary basis worldwide, where these bands may be suitable for Safety-of-Life applications as other users may not be allowed to interfere with their signals. They may correspond to an upper L-band (e.g., 1559-1610 MHz), having the GPS L1, Galileo E1 and GLONASS G1, and to the bottom of a lower L-band (e.g., 1151-1214 MHz) where GPS L5 and Galileo E5 are located, with E5a and L5 coexisting in the same frequencies. The remaining GPS L2, GLONASS G2 and Galileo E6 signals are in the bands 1215.6-1350 MHz. These bands may be allocated to radio-location services (e.g., ground radars) and RNSS on a primary basis, hence the signals in these bands may be more vulnerable to interference compared to the previous ones.

In addition to errors associated with GNSS-based positioning mentioned above, GNSS-based positioning may also include inter/intra system/signal time biases (ISTB). In some examples, ISTB may also be referred to as "inter-satellite-type bias." ISTB is a hardware delay due to different band paths, and such hardware delay may not change dramatically over time. For example, when a GNSS device performs GNSS-based positioning using satellites from different systems (e.g., using satellites from combination of GPS, GLONASS, and Galileo, etc. as described in connection with FIG. 6), ISTB may occur from these systematic differences and may impact the accuracy of the positioning. In other words, when a GNSS receiver uses signals from satellites of different types, it may experience biases in the computed position, velocity, and time estimates. In some scenarios, to account for ISTB, GNSS receiver manufacturers and the operators of the GNSS system may work with each other to provide correction models and information to users. These models may help correct for the ISTB and enable the GNSS receiver to provide more accurate position information.

For positioning engines (e.g., PE, PPE, PPP, etc.), ISTB may be an unknown term/error that is specified to be handled separately. For example, after a positioning engine applies a base correction (e.g., received from an RTK base station as described in connection with FIG. 6), errors such as satellite clock errors, differential code biases (DCBs), troposphere delay, and/or ionosphere delay may be canceled out, leaving ISTB to be resolved by the positioning engine. In other words, except the geometry range and the receiver clock, the remaining unknown terms to be handled by the positioning engine may be the ISTB and the multipath. In some examples, RAIM (e.g., SS RAIM) may be used to identify the outlier pseudo-range (PR) with large multipath.

As an illustration, a PR measurement (P) for a specified satellite signal band (Li) ($P_{Li}$) performed by a GNSS receiver may be represented by:

$$P_{Li} = \rho_{Li} + dT + dOrb + dClk + ICTB + DCB_{Li} + ISTB_{Li} + dTrop + \frac{f_1^2 * dIono}{f_i^2} + MP + \epsilon_{P_{Li}}$$

where P is the pseudo-range measurement (m), ρ is the geometry range (m), dT is the receiver clock (m), dOrb is the satellite orbit error (m), dClk is the satellite clock error (m), ICTB is the inter-constellation timescale bias at satellite part, caused by different GNSS constellation satellite time scale differences (m), DCB is the differential code bias at satellite part caused by hardware bandpass delay at satellite parts (m), ISTB is the inter/intra system/signal time biases at receiver part caused by hardware bandpass delay at receiver parts (m), dTrop is the troposphere residual error after applying the model (m), dIono is the ionosphere residual error on L1 band after applying the model (m), f is the central frequency of specified signal band (Hz), L*is the indicator of signal band (e.g., L1, L2, L5, etc.), MP is the multipath error (m), and c is the noise (m).

In certain positioning engines, such as the PPE, satellite clock error and ICTB/DCB may be identical between a base station and a rover device. Also, for short baseline, satellite orbit error, troposphere/ionosphere residual error may be virtually the same between the base station and the rover device. In an open sky environment, the rover device is also less likely to be affected by multipath. Therefore, after applying the base correction from the base station (B1), the rover device (R)'s PR measurement may be described as below:

$$\Delta P_{Li}^{B1,R} = \Delta\rho_{Li} + \Delta dT + \Delta ISTB_{Li}^{B1,R} + \epsilon_{\Delta P_{Li}}$$

where Δ is the between-receiver single-differencing operator.

In some scenarios, after the device position is precisely known, such as with the centimeter (cm) level accuracy after achieving ambiguity-fixed solution, ISTB between two frequency bands (e.g., between GPS L1 C/A and GAL E1C) may be accurately computed just using single epoch snapshot of the measurements:

$$\Delta I\overline{STB}_{Li,Lj}^{B1,R} = Avg\left(\Delta P_{Lj}^{B1,R} - \Delta\rho_{Lj}\right) - Avg\left(\Delta P_{Li}^{B1,R} - \Delta\rho_{Li}\right)$$

Then, the uncertainty of such determined ISTB may be computed as:

$$\sigma ISTB_{Li,Lj}^{B1,R} = \sqrt{\frac{\sigma_{Lj}^2}{n_{Lj}} + \frac{\sigma_{Li}^2}{n_{Li}}}$$

where $$\sigma ISTB_{Li}^{B1,R}$$

is the uncertainty of the determined ISTB, $n_{L*}$ is the number of satellite number at L*band, and $\sigma_{L*}$ is the measurement standard deviation at L*band (m), computed as $$std(\Delta P_{L*}^{B1,R} - \Delta\rho_{L*}).$$

However, the ISTB accuracy may be affected by which signal is being selected as the reference signal. As such, in one aspect of the present disclosure (discussed below), a UE may be configured to select a satellite signal with the smallest $\sigma_{L*}$ as the reference signal to generate such ISTB information to improve the overall ISTB information accuracy. For the generated ISTB information, the value of the selected reference signal may be zero (0). In the other word, if Li is selected as the reference signal, then:

$$\Delta ISTB_{Li}^{B1,R} = 0$$

$$\Delta ISTB_{Lj}^{B1,R} = \Delta ISTB_{Li,Lj}^{B1,R}$$

Table 2 below shows example magnitude of ISTB associated with different signal bands.

TABLE 2 example magnitude of ISTB for different signal bands

| Signal Band | ISTB (m) | ISTB (μs) |
|---|---|---|
| GPS L1 C/A | 0 | 0.00 |
| GPS L5 | −2331 | −7.77 |
| BDS B1I | −440 | −1.46 |
| BDS B1C | −436 | −1.45 |
| BDS B2A | −2331 | −7.77 |
| GAL E1C | −436 | −1.45 |
| GAL E5A | −2331 | −7.77 |
| QZS L1 C/A | 0 | 0.00 |
| QZS L5 | −2331 | −7.77 |

As discussed above, GNSS-based positioning uses measurements from multiple satellites to estimate the position, velocity, and time (PVT) for a GNSS device. When the measurements from one or several satellites have outliers (e.g., normally caused by multipath), the determined PVT accuracy may be heavily degraded. An RAIM algorithm is introduced to identify and remove the impact from those outliers for the GNSS-based positioning. In an RB RAIM, the basic assumption is that the post-fit residuals are Gaussian and the outlier is minority percentage of all available measurements. The RB RAIM may be implemented in iterative steps. In step-RB-1, a global check test statistic firstly, namely VtPV, is computed by using the post-fit residual vector (V) and measurement priori weighting matrix (P) by using all available measurement. In step-RB-2, a global test is conducted, the global test statistic will be compared to a test threshold which normally is computed based on Chi-square distribution, if the global test fails, the RB RAIM will move to next step called local test. In step-RB-3, if local test is triggered, the local test for just one measurement will be conducted, the selection of such single measurement is based on the relative matrix between pre-fit residual and post-fit residual, normally the satellite with highest correlation coefficient derived from the relative matrix is selected to conduct the local test. In step-RB-4, if the selected single outlier is identified, then it will be removed from the measurement list, then continue the iteration of step RB-1, until the global check passes in step RB-2, then may output the final PVT solution.

On the other hand, in SS RAIM, the assumption is that the outliers may be large percentage of all available measurements. In step-SS-1, based on some priori knowledge or design flavor, all measurements are split into a lot of subsets, such as subsets with different CN0 threshold, different elevation mask angle, subsets with specified signal band, etc. In step-SS-2, within each subset, full iteration of the RB RAIM may be implemented, then each subset may generate a PVT information and measurement outlier information just using the measurement within each subset, namely subset PVTs and subset outliers. To generate that meaningful information, each subset may need to have enough redundancy, i.e., the number of measurement is larger than the number of unknown estimates. In step SS-3, by combining the subset outlier information generated in step SS-2 from all valid subsets. An all-set PVT may be generated by using all available measurements but excluding those subset outliers. In step SS-4, a test statistic will be generated to cross-check the consistency between subset PVTs and all-set PVT, the final PVT solution may be available when such test passes.

As SS RAIM algorithm(s) may specify at least a certain number of measurements to be known (e.g., the number of measurement is specified to be larger than the number of unknown estimates), the availability/applicability of SS RAIM may be low if ISTBs are unknown. In other words, when ISTBs are specified to be estimated (e.g., to be account for), the number of unknown estimates to be solved by the positioning engine may be larger (e.g., the ISTB term may be specified to be estimated along with position and receiver clock). In addition, as each subset may specify redundancy in the SS RAIM, when a positioning engine is specified to estimate these additional ISTBs, there may be potentially less subsets that can be used in the SS RAIM. For example, if for one subset selection there are three (3) GPS L1 C/A, two (2) BDS B1I, and one (1) GAL E1C, the number of measurements may be six (6) (e.g., 3+2+1=6). If the number of unknown estimates is also six (6) (e.g., 3 position XYZ, 1 clock error, and 2 ISTBs, etc.), the measurement redundancy may be zero (0), which means such subset selection may not be used for the SS RAIM.

Aspects presented herein may improve the applicability and availability of solution separation (e.g., the solution separation receiver autonomous integrity monitoring (SS RAIM)) for positioning engines (e.g., PPE, PPP, etc.). Aspects presented herein may enable ISTB to be calibrated or pre-calibrated for a positioning engine (which may be referred to as the "Level-1 calibration" for purposes of the present disclosure), and the positioning engine may be configured to refine/calibrate this calibrated/pre-calibrated ISTB to achieve an improved positioning accuracy and performance (which may be referred to as the "Level-2 calibration" for purposes of the present disclosure), such as by using the outlier information obtained based on the calibrated/pre-calibrated ISTB. For example, in one aspect of the present disclosure, a UE (or a positioning engine of the UE) may be configured to perform ISTB pre-calibration to a first threshold of accuracy (e.g., <10 cm). Then, the UE may be configured to apply the calibrated ISTB in a challenging environment, which increases the availability/applicability of using SS RAIM where rough position via SS RAIM may provide better outlier detection/removal. For purposes of the present disclosure, a challenging environment, at a high level, may refer to an environment or a condition where a GNSS device/receiver is unable to receive/decode GNSS signals from at least four satellites and/or unable to receive/decode GNSS signals with signal strength above a threshold from at least four satellites, such that the GNSS device may not be able to perform GNSS-based positioning effectively and/or accurately.

Figure 8:
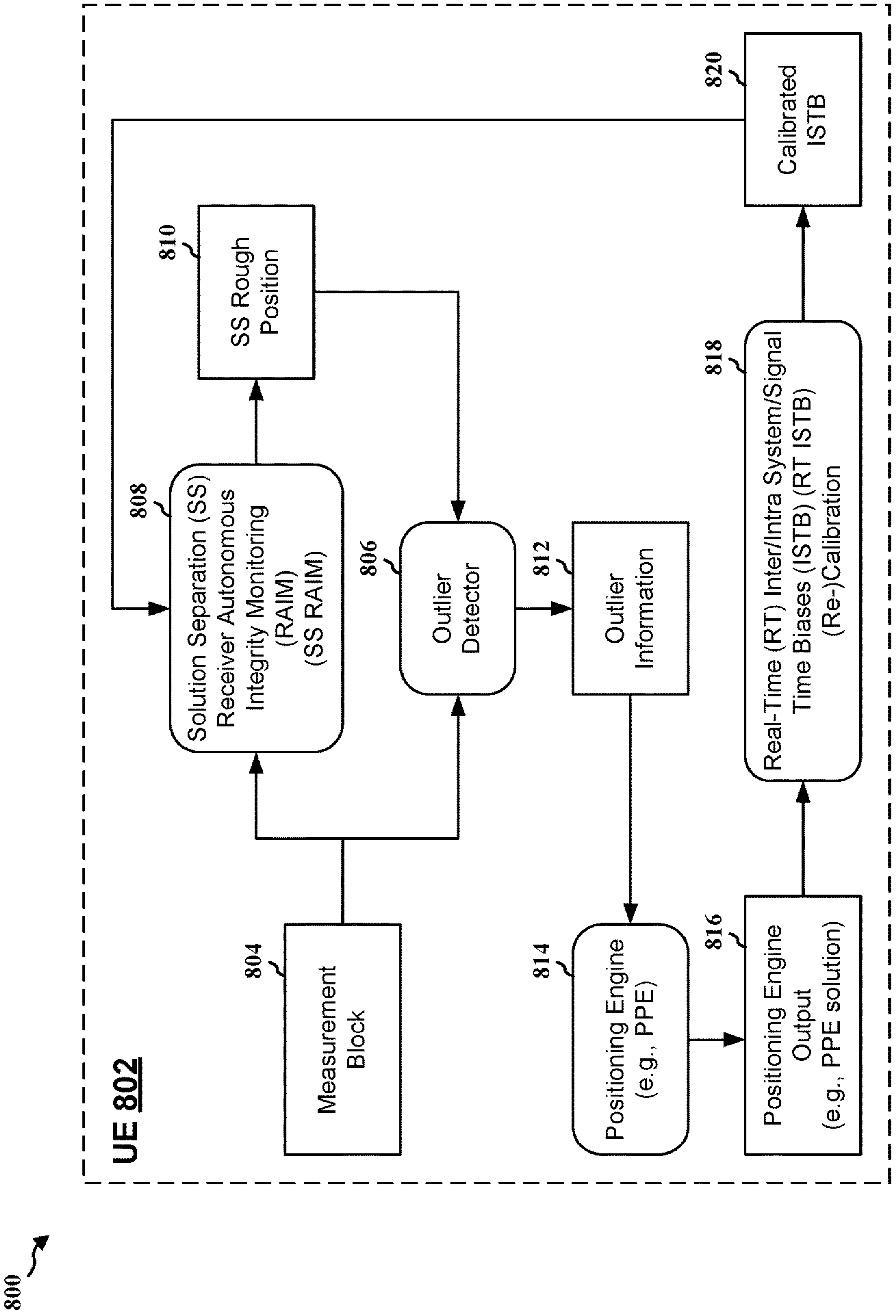
FIG. 8 is a diagram illustration an example of using inter/intra system/signal time biases (ISTB) calibration to improve positioning engine solution separation availability in accordance with various aspects of the present disclosure.

FIG. 8 is a diagram 800 illustration an example of using ISTB calibration to improve positioning engine solution separation availability in accordance with various aspects of the present disclosure. In one aspect of the present disclosure, a UE may be configured to calibrate (or pre-calibrate) ISTB to a first level of accuracy (which may be referred to as the "Level-1 calibration"), such as via a measurement engine (ME) or a measurement block/module. Although some UEs may have the capability to pre-calibrate intra-time biases (TB) (e.g., L1/L5 within each constellation), inter-TB may still exist and the magnitude may be significant (e.g., more than 400 meters). In some examples, inter/intra-TB may be calibrated/pre-calibrated to certain level of accuracy (e.g., less than 10 meters). After calibrating (or pre-calibrating) ISTB to the first level of accuracy, the UE may calibrate/refine the ISTB in real-time (RT) to a second level of accuracy (e.g., a better accuracy compared to the first level of accuracy, which may be referred to as the "Level-2 calibration"). The UE may perform this calibration/refinement via a positioning engine, such as a PPE. In some scenarios, if the UE is in an open-sky environment, such ISTB may be calibrated at even better accuracy, such as with an accuracy that is within one meter (e.g., using PPE ambiguity-fixed solution or other known position source). On other hand, if the UE is in a challenging environment where multiple outliers may exist, such calibrated ISTB may benefit the applicability of SS RAIM. For example, by applying the calibrated ISTB in SS RAIM, the UE is not specified to estimate the ISTB anymore. Thus, the number of unknown estimates is smaller and improves the redundancy (i.e., SS RAIM specifies the number of measurements to be greater than the number of unknown estimates). Then, the UE may potentially have more subsets to be used in SS RAIM. In addition, the "Level-2 calibration" may not have dependency on the "Level-1 calibration." One the UE obtains the calibrated value, such value may also be used by other UEs.

As shown at 804, a UE 802 may be configured to perform measurements for a set of GNSS satellites (the measurements may refer to the number of satellites being measured in this context, where each measurement may correspond to one satellite), where the measurements may be performed by a measurement block/module. The measurement block/module may also be configured to calibrate/pre-calibrate a set of inter/intra system/signal time biases (ISTBs) among satellites to a certain level of accuracy. For example, based on satellite information provided by satellite vendors, correction data from base station or other UEs, and/or historical records, etc., the UE 802 (or the measurement block/module) may (pre-)calibrate the ISTB to a first level of accuracy or to meet a first accuracy threshold (e.g., an accuracy of within 10 meters). In some examples, as ISTBs may exist between satellites operating on different frequency bands or are associated with different satellite types, the UE 802 may also be configured to (pre-)calibrate the ISTB when the measurements include at least two satellites operating on different frequency bands or are associated with different satellite types.

At 806, based on the (pre-)calibrated ISTB (e.g., at 804), the UE 802 may perform an outlier detection (e.g., via an outlier detector) to obtain outlier information associated with the measurements (e.g., measurements from the measurement block at 804) using solution separation (SS) receiver autonomous integrity monitoring (RAIM). For example, as shown at 808, based on the measurements from the measurement block (including the (pre-)calibrated ISTB), the UE 802 may use an SS RAIM module to obtain/output a rough position of the UE 802. Then, as shown at 810, this rough position may be passed to the outlier detector for outlier detection, and as shown at 812, the outlier detector may generate a set of outlier information related to the measurements from the measurement block. For purposes of the present disclosure, in the context of GNSS-based positioning and/or GNSS measurements, an outlier may refer to a data point that (significantly) deviates from the expected or typical values in a set of measurements (e.g., the deviation exceeds a defined threshold). Outliers may arise due to various factors, including errors in the measurement equipment, atmospheric conditions, signal interference, or issues with the GNSS satellite constellation, etc. In addition, a redundancy may refer to the difference between the number of measurements and the number of unknown estimates.

At 814, a positioning engine or a positioning engine module may be configured to receive the outlier information from the outlier detector, and as shown at 816, the positioning engine may generate a set of positioning engine outputs (which may be referred to as solutions, such as PE/PPE/PPP solutions) based on the outlier information. For example, the set of positioning engine outputs may include position information, velocity information, timing information, uncertainty information, outlier information, and/or integrity information associated with the UE 802 and/or the satellites being measured. In some implementations, the UE 802 may also be configured to provide an indication of the set of positioning engine outputs. For example, the UE 802 transmit, to a network entity (e.g., a base station, a location server, etc.), the indication of the set of positioning engine outputs, or store the indication of the set of positioning engine outputs.

At 818, based on the set of positioning engine outputs from the positioning engine, the UE 802 may be configured to refine/re-calibrate the set of ISTBs (e.g., ISTBs (pre-) calibrated at 804) to meet/achieve a higher level of accuracy (which may be referred to as the "Level-2 calibration"). For example, based on the set of positioning engine outputs from the positioning engine, the UE 802 may be configured to (re-)calibrate the ISTB (e.g., via a real-time (RT) ISTB (re-)calibration module or using the positioning engine), to a second level of accuracy or to meet a second accuracy threshold (e.g., an accuracy of within 1 meter). In other words, the second level of accuracy is higher than the first level of accuracy (or the second accuracy threshold is lower than the first accuracy threshold).

Then, as shown at 820, the RT ISTB (re-)calibration module may output a set of (re-)calibrated ISTBs, where this set of (re-)calibrated ISTBs may be used by the SS RAIM module at 808 for performing subsequent outlier detection (e.g., by the outlier detector at 806). The UE 802 may be configured to repeat the processes described between 806 and 820 during a positioning session to achieve improved overall positioning performance.

By applying the (re-)calibrated ISTB in SS RAIM, the UE 802 may not be specified to estimate the ISTBs anymore, which makes the number of unknown estimate to be smaller, and therefore improve the redundancy. Then, there may be potentially more subsets that can be used by the UE 802 in SS RAIM. For example, for one subset selection, there may be six (6) measurements (e.g., 3 GPS L1 C/A, 2 BDS B1I, 1 GAL E1C, etc.). In other words, the number of measurements is six (6). In this example, the number of unknown estimate may be four (4) (e.g., 3 position XYZ, 1 clock error, 0 ISTB) instead of six (6) (as discussed in an example above). As such, the measurement redundancy is two (2), and this subset may be used by the UE 802 in SS RAIM. The Level-2 calibration may have no dependency on the Level-1 calibration. In addition, after the UE 802 obtains the calibrated ISTB value, such value may be used by other UEs (e.g., the UE 802 may transmit the calibrated ISTB value to other UEs or a base station).

In some examples, for the Level-2 calibration, as the satellite clock error and ICTB/DCB may be identical between a base station and the UE 802, for a short baseline, satellite orbit error, troposphere/ionosphere residual error may be virtually the same between the base station and the UE 802. In open sky environment, device will also be less affected by multipath. Therefore, after applying the base correction from the base station, the pseudo-range measurement of the UE 802 may be represented by:

$$\Delta P_{Li}^{B1,R} = \Delta\rho_{Li} + \Delta dT + \Delta ISTB_{Li}^{B1,R} + \epsilon_{\Delta P_{Li}}$$

where Δ is the between-receiver single-differencing operator as described above, B1 may indicate a first base station, and R may indicate the UE 802. After the position of the UE is precisely known such as having a centimeter level accuracy after achieving ambiguity-fixed solution, ISTB between two frequency bands (e.g., between GPS L1 C/A and GAL E1C) may be accurately computed just using single epoch snapshot of the measurements:

$$\Delta I\widetilde{STB}_{Li,Lj}^{B1,R} = Avg\left(\Delta P_{Lj}^{B1,R} - \Delta\rho_{Lj}\right) - Avg\left(\Delta P_{Li}^{B1,R} - \Delta\rho_{Li}\right)$$

The uncertainty of such ISTB may be compute as:

$$\sigma ISTB_{Li,Lj}^{B1,R} = \sqrt{\frac{\sigma_{Lj}^2}{n_{Lj}} + \frac{\sigma_{Li}^2}{n_{Li}}}$$

where $$\sigma ISTB_{Li}^{B1,R}$$

is the uncertainty of the determined ISTB, $n_{L*}$ is the number of satellite number at L*band, and $\sigma_{L*}$ is the measurement standard deviation at L*band (m), computed as $$std\left(\Delta P_{L*}^{B1,R} - \Delta\rho_{L*}\right).$$

In another aspect of the present disclosure, as the ISTB accuracy may be affected by selecting which signal as reference signal, the UE 802 may be configured to select the signal with smallest $\sigma_{L*}$ as the reference signal to generate such ISTB information to improve the overall ISTB information accuracy. For example, for the generated ISTB information, the value of the selected reference signal may be zero (0). In the other word, if select Li as reference signal:

$$\Delta ISTB_{Li}^{B1,R} = 0$$

$$\Delta ISTB_{Lj}^{B1,R} = \Delta ISTB_{Li,Lj}^{B1,R}$$

In other words, to (re-)calibrate the set of ISTBs for a set of measured satellites to meet the second level of accuracy or the second accuracy threshold, the UE 802 may be configured to select a signal received from a satellite in the set of measured satellites as a reference signal for calculating the set of ISTBs for the set of satellites, where the selected signal may be specified to have a smallest standard deviation measurement for a corresponding band compared to other signals from other satellites in the set of measured satellites. Then, the UE 802 may calculate the set of ISTBs between the set of satellites based on the reference signal, and (re-)calibrate the set of ISTBs for the set of measured satellites based on the calculated set of ISTBs. In some examples, to calculate the set of ISTBs between the set of satellites based on the reference signal, the UE 802 may be configured to estimate the uncertainty value for each calculated ISTB in the set of ISTBs.

In some scenarios, it may be challenging for the UE 802 to apply the calibrated ISTB during a base station swap (e.g., when the UE 802 switches its connection from the first base station (B1) to a second base station (B2)). For example, while the UE 802 is in a challenging environment, the UE 802 may not be able to ignore the multipath (MP) term, and when the UE 802 swaps to the second base station (B2), the pseudo-range measurement for solution separation purpose after applying the new (second) base station may be represented by:

$$\Delta P_{Lj}^{B2,R} = \Delta\rho_{Lj} + \Delta dT + \Delta ISTB_{Lj}^{B2,R} + MP + \epsilon_{\Delta P_{Lj}}$$

However, as the calibrated ISTB value may be based on the first base station (B1), it may not be directly applied by the UE 802 for solution separation purpose.

As such, in another aspect of the present disclosure, the UE 802 may be configured to use the base station correction information (e.g., GNSS measurements/correction data from a base station) for both the first base station (B1) and the second base station (B2), and the ISTB between these two base stations may be determined/computed as:

$$\Delta I\widetilde{STB}_{Li}^{B1,B2} = Avg\left(\Delta P_{Lj}^{B1,B2} - \Delta\rho_{Lj}\right) - Avg\left(\Delta P_{Li}^{B1,B2} - \Delta\rho_{Li}\right)$$

and the ISTB to be compensated is:

$$\Delta ISTB_{Lj}^{B2,R} = \Delta ISTB_{Lj}^{B2,R} + \Delta ISTB_{Lj}^{B1,B2}$$

In some implementations, the uncertainty of such ISTB may also be provided. By using the ISTB uncertainty information, the measurement uncertainty may be more accurate, thereby achieving a better horizontal-error (HE) and/or horizontal estimated position error (HEPE) performance.

Figure 9:
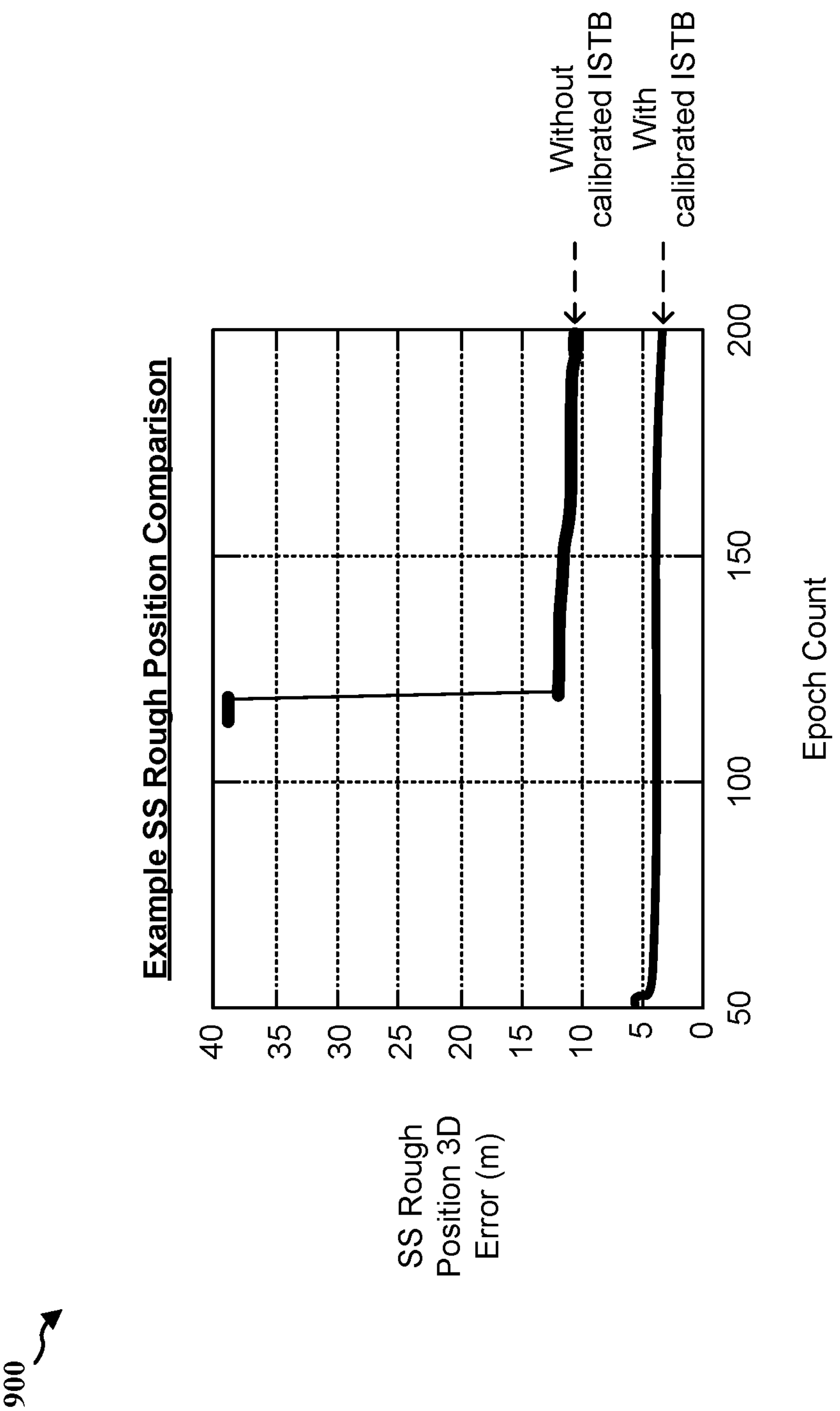
FIG. 9 is a diagram illustrating an example of solution separation (SS) rough position comparison between SS receiver autonomous integrity monitoring (RAIM) with calibrated ISTB and SS RAIM without calibrated ISTB in accordance with various aspects of the present disclosure.

FIG. 9 is a diagram 900 illustrating an example of a SS rough position comparison between SS RAIM with calibrated ISTB and SS RAIM without calibrated ISTB in accordance with various aspects of the present disclosure. As shown by the diagram 900, by using the calibrated ISTB for SS RAIM as shown at 820 and 808, the SS rough position availability becomes higher, and the SS rough position accuracy is also improved compared to SS RAIM without the calibrated ISTB.

Figure 10A:
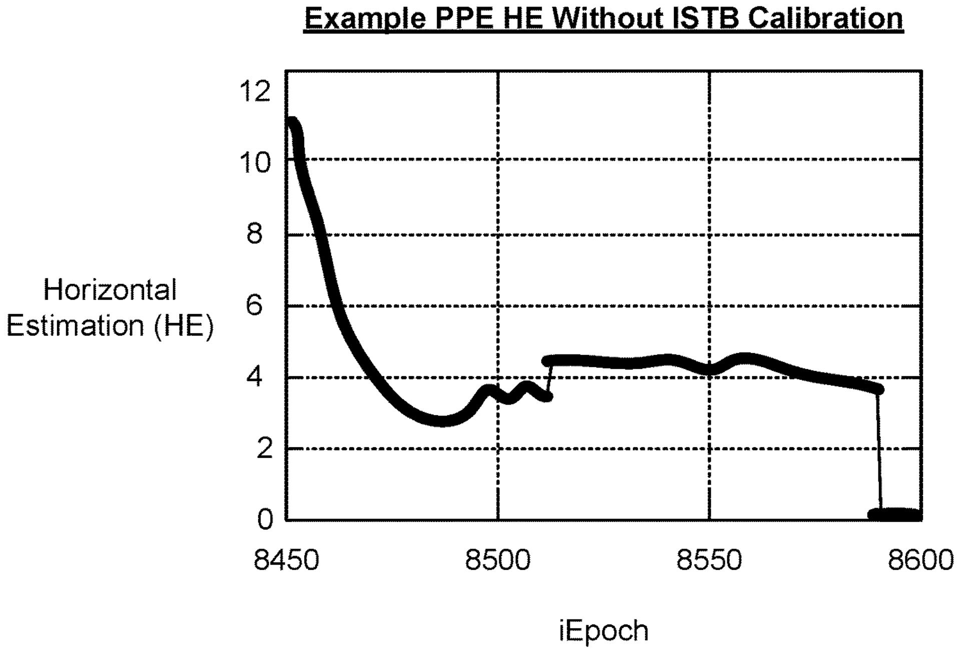
FIG. 10A is a diagram illustrating an example of a precise positioning engine (PPE) horizontal error (HE) without ISTB calibration in accordance with various aspects of the present disclosure.
Figure 10B:
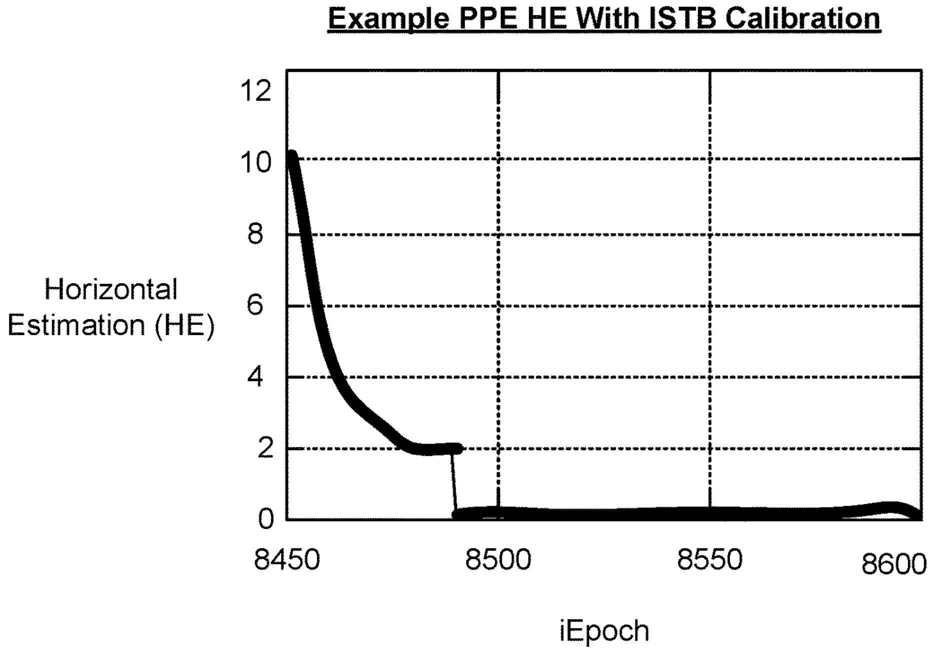
FIG. 10B is a diagram illustrating an example of a PPE HE with ISTB calibration in accordance with various aspects of the present disclosure.

FIG. 10A is a diagram 1000A illustrating an example of a PPE HE without ISTB calibration in accordance with various aspects of the present disclosure, and FIG. 10B is a diagram 1000B illustrating an example of a PPE HE with ISTB calibration in accordance with various aspects of the present disclosure. As shown by the diagram 1000B, for a PPE with ISTB calibration, the performance of the PPE is significantly improved compared to the PPE without ISTB calibration as shown by the diagram 1000A as the ISTB calibration may enable the PPE to achieve ambiguity-fixing much faster.

Figure 11:
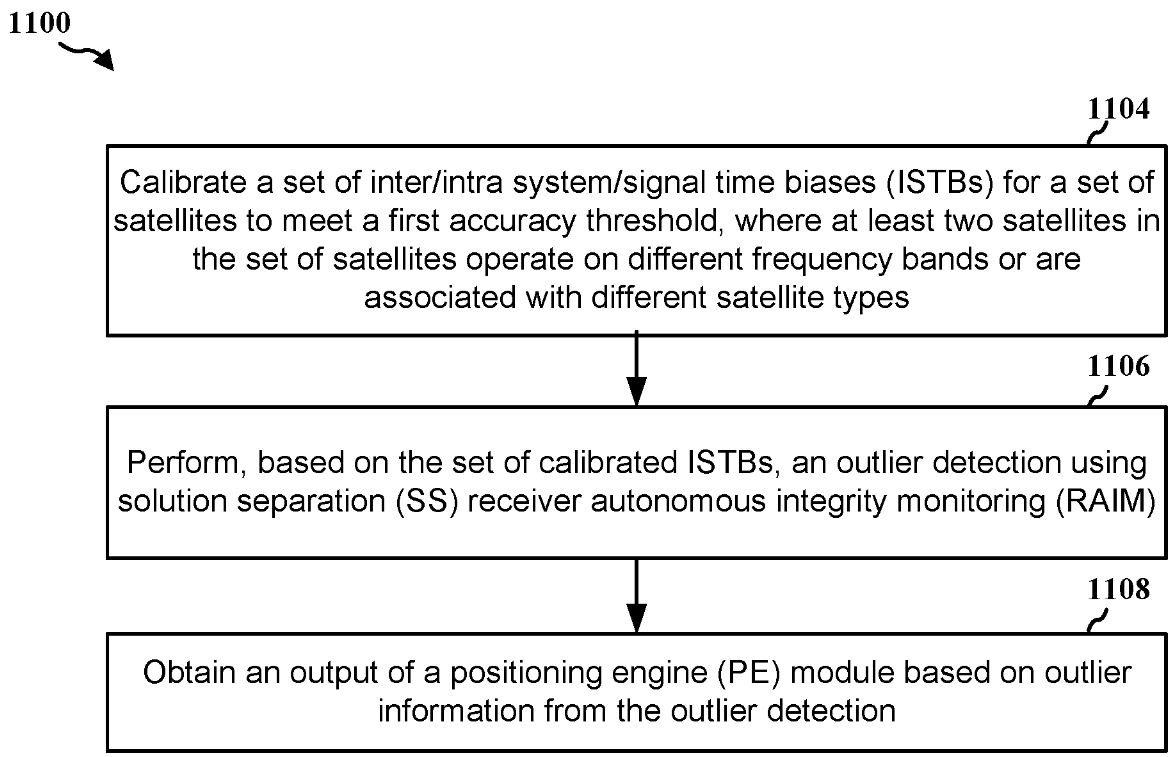
FIG. 11 is a flowchart of a method of location estimation.

FIG. 11 is a flowchart 1100 of location estimation at a user equipment (UE). The method may be performed by a UE (e.g., the UE 104, 404, 802; the GNSS device 506; the rover device 604; the apparatus 1304). The method may enable the UE to calibrate ISTB for a positioning engine and refine/re-calibrate the calibrated ISTB continuously to achieve an improved positioning accuracy and performance.

At 1104, the UE may calibrate a set of ISTBs for a set of satellites to meet a first accuracy threshold, where at least two satellites in the set of satellites operate on different frequency bands or are associated with different satellite types, such as described in connection with FIG. 8. For example, at 804, based on satellite information provided by satellite vendors, correction data from base station or other UEs, and/or historical records, etc., the UE 802 (or the measurement block/module) may (pre-)calibrate the ISTB to a first level of accuracy or to meet a first accuracy threshold (e.g., an accuracy of within 10 meters). In some examples, as ISTBs may exist between satellites operating on different frequency bands or are associated with different satellite types, the UE 802 may also be configured to (pre-)calibrate the ISTB when the measurements include at least two satellites operating on different frequency bands or are associated with different satellite types. The calibration of the set of ISTBs may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13.

At 1106, the UE may perform, based on the set of calibrated ISTBs, an outlier detection using SS RAIM, such as described in connection with FIG. 8. For example, at 806, based on the (pre-)calibrated ISTB (e.g., at 804), the UE 802 may perform an outlier detection (e.g., via an outlier detector) to obtain outlier information associated with the measurements (e.g., measurements from the measurement block at 804) using solution separation (SS) receiver autonomous integrity monitoring (RAIM). The outlier detection may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, to perform, based on the set of calibrated ISTBs, the outlier detection using the SS RAIM, the UE may be configured to provide, to the SS RAIM, the set of calibrated ISTBs for the outlier detection.

At 1108, the UE may obtain an output of a PE module based on outlier information from the outlier detection, such as described in connection with FIG. 8. For example, at 814, a positioning engine or a positioning engine module may be configured to receive the outlier information from the outlier detector, and as shown at 816, the positioning engine may generate a set of positioning engine outputs (which may be referred to as solutions, such as PE/PPE/PPP solutions) based on the outlier information. The obtainment of the output of the PE module may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, to obtain the output of the PE module based on the outlier information from the outlier detection, the UE may be configured to generate the output of the PE module based on the outlier information from the outlier detection.

In one example, the output of the PE module corresponds to a PE solution that includes at least one of: position information, velocity information, timing information, uncertainty information, the outlier information, or integrity information.

In another example, to obtain the output of the PE module based on the outlier information from the outlier detection, the UE may compute a position of the UE based on the outlier information from the outlier detection.

In another example, the UE may re-calibrate, based on the output of the PE module, the set of calibrated ISTBs to meet a second accuracy threshold, such as described in connection with FIG. 8. For example, at 818, based on the set of positioning engine outputs from the positioning engine, the UE 802 may be configured to refine/re-calibrate the set of ISTBs (e.g., ISTBs (pre-)calibrated at 804) to meet/achieve a higher level of accuracy. The re-calibration of the set of calibrated ISTBs may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, the second accuracy threshold may be lower than the first accuracy threshold. In some implementations, to re-calibrate the set of calibrated ISTBs to meet the second accuracy threshold, the UE may be configured to select a signal received from a satellite in the set of satellites as a reference signal for calculating ISTBs for the set of satellites, where the selected signal has a smallest standard deviation measurement for a corresponding band compared to other signals from other satellites in the set of satellites, calculate the ISTBs between the set of satellites based on the reference signal, and re-calibrate the set of calibrated ISTBs for the set of satellites based on the calculated ISTBs. In some implementations, to calculate the ISTBs between the set of satellites based on the reference signal, the UE may be configured to estimate an uncertainty value for each of the calculated ISTBs.

In another example, the UE may receive first correction information from a first base station, where the calibration of the set of ISTBs is based on the first correction information, such as described in connection with FIG. 8. For example, during a base station swap, the UE 802 may be configured to use the base station correction information (e.g., GNSS measurements/correction data from a base station) for both the first base station (B1) and the second base station (B2). The calibration of the set of ISTBs may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, the UE may receive second correction information from a second base station after a swap to the second base station, calculate a second set of ISTBs between the first base station and the second base station based on the first correction information and the second correction information, and perform, based on the calculated second set of ISTBs, a second outlier detection using the SS RAIM. In some implementations, to calibrate the set of ISTBs, the UE may calibrate the set of ISTBs for the swap to the second base station.

In another example, the UE may provide an indication of the output of the PE module, such as described in connection with FIG. 8. For example, at 816, in some implementations, the UE 802 may also be configured to provide an indication of the set of positioning engine outputs. The provision of the indication may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, to provide the indication of the output of the PE module, the UE may be configured to transmit, to a network entity, the indication of the output of the PE module, or store the indication of the output of the PE module.

Figure 12:
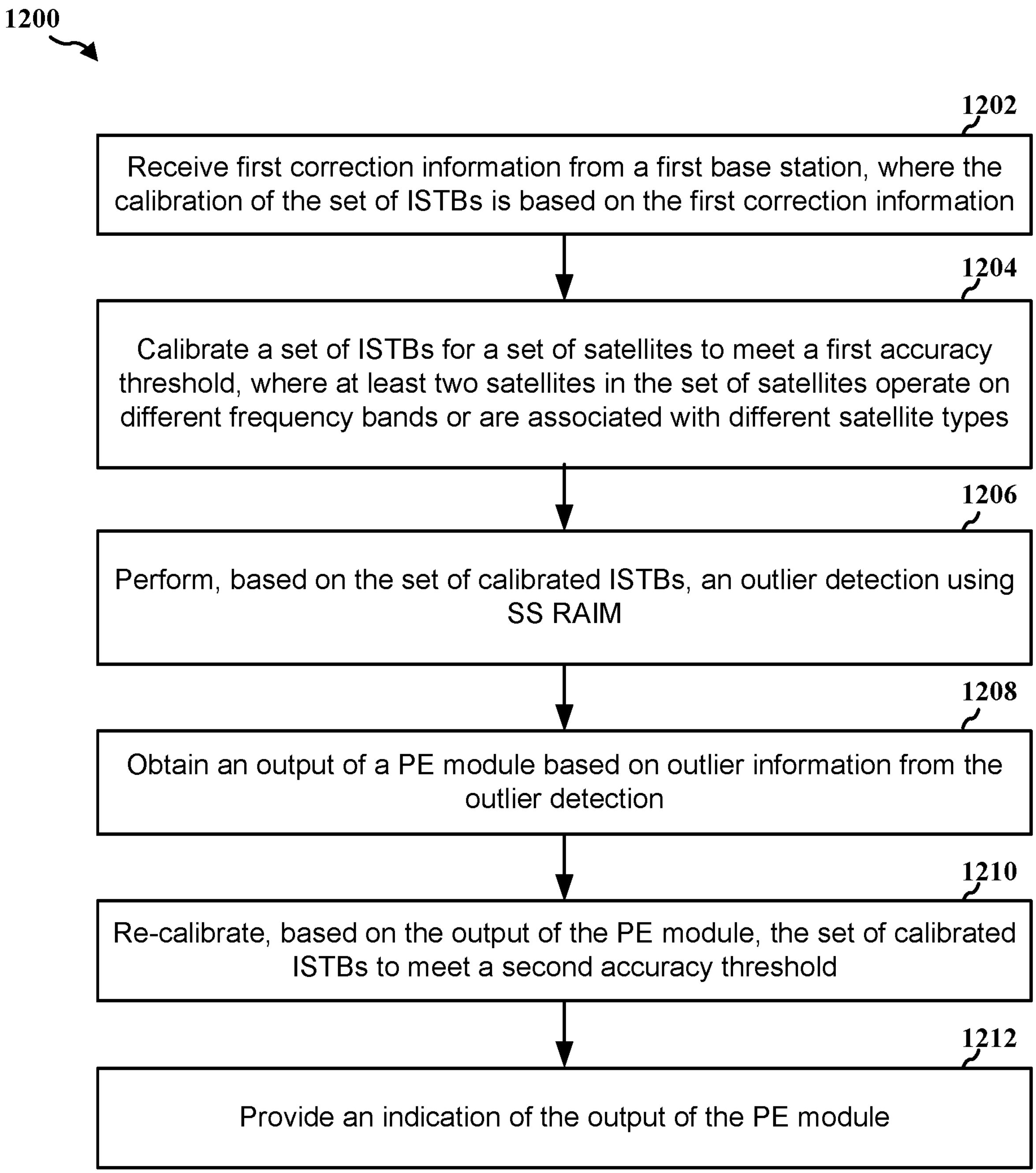
FIG. 12 is a flowchart of a method of location estimation.

FIG. 12 is a flowchart 1200 of location estimation at a user equipment (UE). The method may be performed by a UE (e.g., the UE 104, 404, 802; the GNSS device 506; the rover device 604; the apparatus 1304). The method may enable the UE to calibrate ISTB for a positioning engine and refine/re-calibrate the calibrated ISTB continuously to achieve an improved positioning accuracy and performance.

At 1204, the UE may calibrate a set of ISTBs for a set of satellites to meet a first accuracy threshold, where at least two satellites in the set of satellites operate on different frequency bands or are associated with different satellite types, such as described in connection with FIG. 8. For example, at 804, based on satellite information provided by satellite vendors, correction data from base station or other UEs, and/or historical records, etc., the UE 802 (or the measurement block/module) may (pre-)calibrate the ISTB to a first level of accuracy or to meet a first accuracy threshold (e.g., an accuracy of within 10 meters). In some examples, as ISTBs may exist between satellites operating on different frequency bands or are associated with different satellite types, the UE 802 may also be configured to (pre-)calibrate the ISTB when the measurements include at least two satellites operating on different frequency bands or are associated with different satellite types. The calibration of the set of ISTBs may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13.

At 1206, the UE may perform, based on the set of calibrated ISTBs, an outlier detection using SS RAIM, such as described in connection with FIG. 8. For example, at 806, based on the (pre-)calibrated ISTB (e.g., at 804), the UE 802 may perform an outlier detection (e.g., via an outlier detector) to obtain outlier information associated with the measurements (e.g., measurements from the measurement block at 804) using solution separation (SS) receiver autonomous integrity monitoring (RAIM). The outlier detection may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, to perform, based on the set of calibrated ISTBs, the outlier detection using the SS RAIM, the UE may be configured to provide, to the SS RAIM, the set of calibrated ISTBs for the outlier detection.

At 1208, the UE may obtain an output of a PE module based on outlier information from the outlier detection, such as described in connection with FIG. 8. For example, at 814, a positioning engine or a positioning engine module may be configured to receive the outlier information from the outlier detector, and as shown at 816, the positioning engine may generate a set of positioning engine outputs (which may be referred to as solutions, such as PE/PPE/PPP solutions) based on the outlier information. The obtainment of the output of the PE module may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, to obtain the output of the PE module based on the outlier information from the outlier detection, the UE may be configured to generate the output of the PE module based on the outlier information from the outlier detection.

In one example, the output of the PE module corresponds to a PE solution that includes at least one of: position information, velocity information, timing information, uncertainty information, the outlier information, or integrity information.

In another example, to obtain the output of the PE module based on the outlier information from the outlier detection, the UE may compute a position of the UE based on the outlier information from the outlier detection.

In another example, as shown at 1210, the UE may re-calibrate, based on the output of the PE module, the set of calibrated ISTBs to meet a second accuracy threshold, such as described in connection with FIG. 8. For example, at 818, based on the set of positioning engine outputs from the positioning engine, the UE 802 may be configured to refine/re-calibrate the set of ISTBs (e.g., ISTBs (pre-)calibrated at 804) to meet/achieve a higher level of accuracy. The re-calibration of the set of calibrated ISTBs may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, the second accuracy threshold may be lower than the first accuracy threshold. In some implementations, to re-calibrate the set of calibrated ISTBs to meet the second accuracy threshold, the UE may be configured to select a signal received from a satellite in the set of satellites as a reference signal for calculating ISTBs for the set of satellites, where the selected signal has a smallest standard deviation measurement for a corresponding band compared to other signals from other satellites in the set of satellites, calculate the ISTBs between the set of satellites based on the reference signal, and re-calibrate the set of calibrated ISTBs for the set of satellites based on the calculated ISTBs. In some implementations, to calculate the ISTBs between the set of satellites based on the reference signal, the UE may be configured to estimate an uncertainty value for each of the calculated ISTBs.

In another example, as shown at 1202, the UE may receive first correction information from a first base station, where the calibration of the set of ISTBs is based on the first correction information, such as described in connection with FIG. 8. For example, during a base station swap, the UE 802 may be configured to use the base station correction information (e.g., GNSS measurements/correction data from a base station) for both the first base station (B1) and the second base station (B2). The calibration of the set of ISTBs may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, the UE may receive second correction information from a second base station after a swap to the second base station, calculate a second set of ISTBs between the first base station and the second base station based on the first correction information and the second correction information, and perform, based on the calculated second set of ISTBs, a second outlier detection using the SS RAIM. In some implementations, to calibrate the set of ISTBs, the UE may calibrate the set of ISTBs for the swap to the second base station.

In another example, as shown at 1212, the UE may provide an indication of the output of the PE module, such as described in connection with FIG. 8. For example, at 816, in some implementations, the UE 802 may also be configured to provide an indication of the set of positioning engine outputs. The provision of the indication may be performed by, e.g., the ISTB calibration component 198, the SPS module 1316, the transceiver(s) 1322, the cellular baseband processor(s) 1324, and/or the application processor(s) 1306 of the apparatus 1304 in FIG. 13. In some implementations, to provide the indication of the output of the PE module, the UE may be configured to transmit, to a network entity, the indication of the output of the PE module, or store the indication of the output of the PE module.

Figure 13:
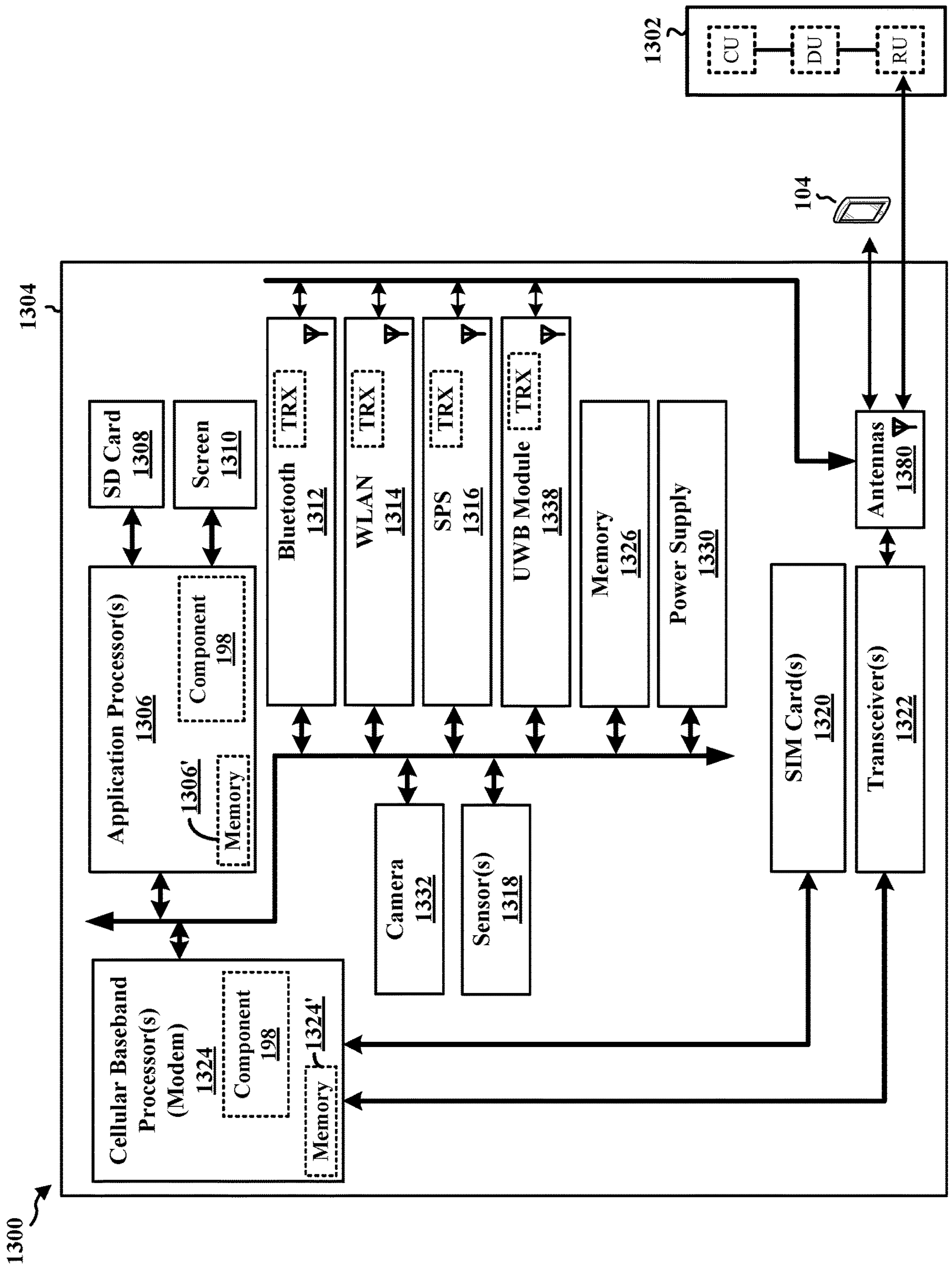
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an ultrawide band (UWB) module 1338 (e.g., a UWB transceiver), an SPS module 1316 (e.g., GNSS module), one or more sensors 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the UWB module 1338, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the ISTB calibration component 198 may be configured to calibrate a set of ISTBs for a set of satellites to meet a first accuracy threshold, where at least two satellites in the set of satellites operate on different frequency bands or are associated with different satellite types. The ISTB calibration component 198 may also be configured to perform, based on the set of calibrated ISTBs, an outlier detection using SS RAIM. The ISTB calibration component 198 may also be configured to obtain an output of a PE module based on outlier information from the outlier detection. The ISTB calibration component 198 may be within the cellular baseband processor(s) 1324, the application processor(s) 1306, or both the cellular baseband processor(s) 1324 and the application processor(s) 1306. The ISTB calibration component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for calibrating a set of ISTBs for a set of satellites to meet a first accuracy threshold, where at least two satellites in the set of satellites operate on different frequency bands or are associated with different satellite types. The apparatus 1304 may further include means for performing, based on the set of calibrated ISTBs, an outlier detection using SS RAIM. The apparatus 1304 may further include means for obtaining an output of a PE module based on outlier information from the outlier detection.

In one configuration, the output of the PE module corresponds to a PE solution that includes at least one of: position information, velocity information, timing information, uncertainty information, the outlier information, or integrity information.

In another configuration, the means for obtaining the output of the PE module based on the outlier information from the outlier detection may include configuring the apparatus 1304 to compute a position of the apparatus 1304 based on the outlier information from the outlier detection.

In another configuration, the apparatus 1304 may further include means for re-calibrating, based on the output of the PE module, the set of calibrated ISTBs to meet a second accuracy threshold. In some implementations, the second accuracy threshold may be lower than the first accuracy threshold. In some implementations, the means for re-calibrating the set of calibrated ISTBs to meet the second accuracy threshold may include configuring the apparatus 1304 to select a signal received from a satellite in the set of satellites as a reference signal for calculating ISTBs for the set of satellites, where the selected signal has a smallest standard deviation measurement for a corresponding band compared to other signals from other satellites in the set of satellites, calculate the ISTBs between the set of satellites based on the reference signal, and re-calibrate the set of calibrated ISTBs for the set of satellites based on the calculated ISTBs. In some implementations, to calculate the ISTBs between the set of satellites based on the reference signal, the apparatus 1304 may be configured to estimate an uncertainty value for each of the calculated ISTBs.

In another configuration, the apparatus 1304 may further include means for receiving first correction information from a first base station, where the calibration of the set of ISTBs is based on the first correction information. In some implementations, the apparatus 1304 may further include means for receiving second correction information from a second base station after a swap to the second base station, means for calculating a second set of ISTBs between the first base station and the second base station based on the first correction information and the second correction information, and means for performing, based on the calculated second set of ISTBs, a second outlier detection using the SS RAIM. In some implementations, to calibrate the set of ISTBs, the UE may calibrate the set of ISTBs for the swap to the second base station.

In another configuration, the apparatus 1304 may further include means for providing an indication of the output of the PE module. In some implementations, the means for providing the indication of the output of the PE module may include configuring the apparatus 1304 to transmit, to a network entity, the indication of the output of the PE module, or store the indication of the output of the PE module.

The means may be the ISTB calibration component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: calibrating a set of inter/intra system/signal time biases (ISTBs) for a set of satellites to meet a first accuracy threshold, wherein at least two satellites in the set of satellites operate on different frequency bands or are associated with different satellite types; performing, based on the set of calibrated ISTBs, an outlier detection using solution separation (SS) receiver autonomous integrity monitoring (RAIM); and obtaining an output of a positioning engine (PE) module based on outlier information from the outlier detection.

Aspect 2 is the method of aspect 1, further comprising: re-calibrating, based on the output of the PE module, the set of calibrated ISTBs to meet a second accuracy threshold.

Aspect 3 is the method of aspect 1 or aspect 2, wherein the second accuracy threshold is lower than the first accuracy threshold.

Aspect 4 is the method of any of aspects 1 to 3, wherein re-calibrating the set of calibrated ISTBs to meet the second accuracy threshold comprises: selecting a signal received from a satellite in the set of satellites as a reference signal for calculating ISTBs for the set of satellites, wherein the selected signal has a smallest standard deviation measurement for a corresponding band compared to other signals from other satellites in the set of satellites; calculating the ISTBs between the set of satellites based on the reference signal; and re-calibrating the set of calibrated ISTBs for the set of satellites based on the calculated ISTBs.

Aspect 5 is the method of any of aspects 1 to 4, wherein calculating the ISTBs between the set of satellites based on the reference signal comprises: estimating an uncertainty value for each of the calculated ISTBs.

Aspect 6 is the method of any of aspects 1 to 5, further comprising: receiving first correction information from a first base station, wherein the calibration of the set of ISTBs is based on the first correction information.

Aspect 7 is the method of any of aspects 1 to 6, further comprising: receiving second correction information from a second base station after a swap to the second base station; calculating a second set of ISTBs between the first base station and the second base station based on the first correction information and the second correction information; and performing, based on the calculated second set of ISTBs, a second outlier detection using the SS RAIM.

Aspect 8 is the method of any of aspects 1 to 7, wherein calibrating the set of ISTBs comprises: calibrating the set of ISTBs for the swap to the second base station.

Aspect 9 is the method of any of aspects 1 to 8, wherein obtaining the output of the PE module based on the outlier information from the outlier detection comprises: generating the output of the PE module based on the outlier information from the outlier detection.

Aspect 10 is the method of any of aspects 1 to 9, wherein the output of the PE module corresponds to a PE solution that includes at least one of: position information, velocity information, timing information, uncertainty information, the outlier information, or integrity information.

Aspect 11 is the method of any of aspects 1 to 10, wherein performing, based on the set of calibrated ISTBs, the outlier detection using the SS RAIM comprises: providing, to the SS RAIM, the set of calibrated ISTBs for the outlier detection.

Aspect 12 is the method of any of aspects 1 to 11, wherein obtaining the output of the PE module based on the outlier information from the outlier detection comprises: computing a position of the UE based on the outlier information from the outlier detection.

Aspect 13 is the method of any of aspects 1 to 12, further comprising: providing an indication of the output of the PE module.

Aspect 14 is the method of any of aspects 1 to 13, wherein providing the indication of the output of the PE module comprises: transmitting, to a network entity, the indication of the output of the PE module, or storing the indication of the output of the PE module.

Aspect 15 is an apparatus for wireless communication at a user equipment (UE), including: at least one memory; and at least one processor coupled to the at least one memory and, based at least in part on stored information that is stored in the at least one memory, the at least one processor, individually or in any combination, is configured to implement any of aspects 1 to 14.

Aspect 16 is the apparatus of aspect 15, further including at least one transceiver coupled to the at least one processor.

Aspect 17 is an apparatus for wireless communication at a user equipment (UE) including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

What is claimed is:

1. An apparatus for wireless communication at a user equipment (UE), comprising:

at least one memory; and at least one processor coupled to the at least one memory, based at least in part on stored information that is stored in the at least one memory, the at least one processor, individually or in any combination, is configured to:

calibrate a set of inter/intra system/signal time biases (ISTBs) for a set of satellites to meet a first accuracy threshold, wherein at least two satellites in the set of satellites operate on different frequency bands or are associated with different satellite types;

perform, based on the set of calibrated ISTBs, an outlier detection using solution separation (SS) receiver autonomous integrity monitoring (RAIM); and obtain an output of a positioning engine (PE) module based on outlier information from the outlier detection.

2. The apparatus of claim 1, wherein the at least one processor, individually or in any combination, is further configured to:

re-calibrate, based on the output of the PE module, the set of calibrated ISTBs to meet a second accuracy threshold.

3. The apparatus of claim 2, wherein the second accuracy threshold is lower than the first accuracy threshold.

4. The apparatus of claim 2, where to re-calibrate the set of calibrated ISTBs to meet the second accuracy threshold, the at least one processor, individually or in any combination, is configured to:

select a signal received from a satellite in the set of satellites as a reference signal for calculating ISTBs for the set of satellites, wherein the selected signal has a smallest standard deviation measurement for a corresponding band compared to other signals from other satellites in the set of satellites;

calculate the ISTBs between the set of satellites based on the reference signal; and re-calibrate the set of calibrated ISTBs for the set of satellites based on the calculated ISTBs.

5. The apparatus of claim 4, wherein to calculate the ISTBs between the set of satellites based on the reference signal, the at least one processor, individually or in any combination, is configured to:

estimate an uncertainty value for each of the calculated ISTBs.

6. The apparatus of claim 1, wherein the at least one processor, individually or in any combination, is further configured to:

receive first correction information from a first base station, wherein the calibration of the set of ISTBs is based on the first correction information.

7. The apparatus of claim 6, wherein the at least one processor, individually or in any combination, is further configured to:

receive second correction information from a second base station after a swap to the second base station;

calculate a second set of ISTBs between the first base station and the second base station based on the first correction information and the second correction information; and perform, based on the calculated second set of ISTBs, a second outlier detection using the SS RAIM.

8. The apparatus of claim 7, wherein to calibrate the set of ISTBs, the at least one processor, individually or in any combination, is configured to:

calibrate the set of ISTBs for the swap to the second base station.

9. The apparatus of claim 1, wherein to obtain the output of the PE module based on the outlier information from the outlier detection, the at least one processor, individually or in any combination, is configured to:

generate the output of the PE module based on the outlier information from the outlier detection.

10. The apparatus of claim 1, wherein the output of the PE module corresponds to a PE solution that includes at least one of:

position information,
velocity information,
timing information,
uncertainty information,
the outlier information, or
integrity information.

11. The apparatus of claim 1, wherein to perform, based on the set of calibrated ISTBs, the outlier detection using the SS RAIM, the at least one processor, individually or in any combination, is configured to:

provide, to the SS RAIM, the set of calibrated ISTBs for the outlier detection.

12. The apparatus of claim 1, wherein to obtain the output of the PE module based on the outlier information from the outlier detection, the at least one processor, individually or in any combination, is configured to:

compute a position of the UE based on the outlier information from the outlier detection.

13. The apparatus of claim 1, wherein the at least one processor, individually or in any combination, is further configured to:

provide an indication of the output of the PE module.

14. The apparatus of claim 13, further comprising at least one of a transceiver or an antenna coupled to the at least one processor, wherein to provide the indication of the output of the PE module, the at least one processor, individually or in any combination, is configured to:

transmit, to a network entity via at least one of the transceiver or the antenna, the indication of the output of the PE module, or store the indication of the output of the PE module.

15. A method of wireless communication at a user equipment (UE), comprising:

calibrating a set of inter/intra system/signal time biases (ISTBs) for a set of satellites to meet a first accuracy threshold, wherein at least two satellites in the set of satellites operate on different frequency bands or are associated with different satellite types;

performing, based on the set of calibrated ISTBs, an outlier detection using a solution separation (SS) receiver autonomous integrity monitoring (RAIM); and obtaining an output of a positioning engine (PE) module based on outlier information from the outlier detection.

16. The method of claim 15, further comprising:

re-calibrating, based on the output of the PE module, the set of calibrated ISTBs to meet a second accuracy threshold.

17. The method of claim 16, wherein the second accuracy threshold is lower than the first accuracy threshold.

18. The method of claim 16, wherein re-calibrating the set of calibrated ISTBs to meet the second accuracy threshold comprises:

selecting a signal received from a satellite in the set of satellites as a reference signal for calculating ISTBs for the set of satellites, wherein the selected signal has a smallest standard deviation measurement for a corresponding band compared to other signals from other satellites in the set of satellites;

calculating the ISTBs between the set of satellites based on the reference signal; and re-calibrating the set of calibrated ISTBs for the set of satellites based on the calculated ISTBs.

19. The method of claim 15, further comprising:

receiving first correction information from a first base station, wherein the calibration of the set of ISTBs is based on the first correction information;

receiving second correction information from a second base station after a swap to the second base station;

calculating a second set of ISTBs between the first base station and the second base station based on the first correction information and the second correction information; and performing, based on the calculated second set of ISTBs, a second outlier detection using the SS RAIM.

20. A non-transitory computer-readable medium storing computer executable code at a user equipment (UE), the code when executed by at least one processor causes the at least one processor to:

calibrate a set of inter/intra system/signal time biases (ISTBs) for a set of satellites to meet a first accuracy threshold, wherein at least two satellites in the set of satellites operate on different frequency bands or are associated with different satellite types;

perform, based on the set of calibrated ISTBs, an outlier detection using a solution separation (SS) receiver autonomous integrity monitoring (RAIM); and obtain an output of a positioning engine (PE) module based on outlier information from the outlier detection.

* * * * *